US012781872B2

(12) United States Patent
Lin et al.

(10) Patent No.: US 12,781,872 B2
(45) Date of Patent: *Nov. 3, 2026

(54) SWITCHING MECHANISM AND LIQUID OUTLET DEVICE

(71) Applicant: FUJIAN DOMOO SANITARY WARE TECHNOLOGY CO., LTD., Nan'an (CN)

(72) Inventors: Xiaofa Lin, Nan'an (CN); Xiaoshan Lin, Nan'an (CN); Qiqiao Liu, Nan'an (CN); Xiaoqing Deng, Nan'an (CN); Feiming Deng, Nan'an (CN); Zhennan Chen, Nan'an (CN); Siming Zhu, Nan'an (CN)

(73) Assignee: Fujian Domoo Sanitary Ware Technology Co., Ltd., Nan'an (CN)

( * ) Notice: Subject to any disclaimer, the term of this patent is extended or adjusted under 35 U.S.C. 154(b) by 43 days.

This patent is subject to a terminal disclaimer.

(21) Appl. No.: 18/974,240

(22) Filed: Dec. 9, 2024

(65) Prior Publication Data

US 2025/0389344 A1 Dec. 25, 2025

(30) Foreign Application Priority Data

Jun. 25, 2024 (CN) ......................... 202421471061.1

(51) Int. Cl.
*F16K 31/52* (2006.01)
*F16K 11/072* (2006.01)

(52) U.S. Cl.
CPC .......... *F16K 31/523* (2013.01); *F16K 11/072* (2013.01)

(58) Field of Classification Search
CPC ........... B05B 12/002; B05B 1/18; B05B 1/16; B05B 1/1636; Y10T 137/9464
(Continued)

(56) References Cited

U.S. PATENT DOCUMENTS

2020/0353486 A1 11/2020 Lin et al.

FOREIGN PATENT DOCUMENTS

CN 202555429 U 11/2012
CN 103170414 A 6/2013
(Continued)

OTHER PUBLICATIONS

WO2019169748—Machine Translation (Year: 2019).*
(Continued)

*Primary Examiner* — Daphne M Barry
(74) *Attorney, Agent, or Firm* — Foley & Lardner LLP

(57) ABSTRACT

A switching mechanism and a liquid outlet device are provided. The switching mechanism includes: a housing assembly having a liquid inlet flow channel, a mounting cavity, and at least one liquid outlet flow channel; a switching assembly; a reset spring; and a driving member. The mounting cavity has a first position and a second position sequentially provided in a first direction. The first position has multiple switching positions. The driving member can move relative to the switching assembly in the first direction under an action of an external force, to compress the reset spring, and the switching assembly is driven to move out of one of the multiple switching positions after the driving member moves a certain distance and to be at least partially located at the second position. In this way, a driving force generated by the reset spring can be prevented from acting on the switching assembly.

15 Claims, 14 Drawing Sheets

(58) Field of Classification Search
USPC .......................................................... 137/801
See application file for complete search history.

(56) References Cited

FOREIGN PATENT DOCUMENTS

| | | | |
|---|---|---|---|
| CN | 203061312 | U | 7/2013 |
| CN | 204878861 | U | 12/2015 |
| CN | 104056738 | B | 5/2016 |
| CN | 212759176 | U | 3/2021 |
| CN | 215567970 | U | 1/2022 |
| CN | 118188843 | A | 6/2024 |
| CN | 221086011 | U | 6/2024 |
| JP | 2002-022041 | A | 1/2002 |
| JP | 2018-009602 | A | 1/2018 |
| WO | WO-2011085670 | A1 | 7/2011 |
| WO | WO-2011095084 | A1 | 8/2011 |
| WO | WO-2019/169748 | A1 | 9/2019 |

OTHER PUBLICATIONS

EP Search Report for EP Application No. EP 24216368, dated May 19, 2025.
International Search Report for PCT Application No. PCT/CN2024/119375, dated Jan. 13, 2025.

* cited by examiner

A

SWITCHING MECHANISM AND LIQUID OUTLET DEVICE

CROSS-REFERENCE TO RELATED APPLICATION

The present application claims priority to Chinese patent application No. 202421471061.1, filed on Jun. 25, 2024 and entitled "Switching Mechanism and Liquid Outlet Device". The contents of the above application are incorporated by reference herein in its entirety.

TECHNICAL FIELD

The present disclosure relates to, but is not limited to, kitchen and bathroom technologies, and particularly relates to a switching mechanism and a liquid outlet device.

BACKGROUND

In some liquid outlet devices, the switching assembly is generally moved to the liquid driving position, so that the switching assembly can rotate by the driving effect of the liquid to realize the switching of the liquid path. The switching assembly is generally reset by a reset spring, and during the rotation of the switching assembly, the reset spring is always in contact with the switching assembly, which hinders the rotation of the switching assembly. Therefore, when a driving force of the liquid is less, the switching assembly might not rotate, resulting in an inability of the liquid outlet device to switch the liquid path.

SUMMARY

The present disclosure provides a switching mechanism and a liquid outlet device, and aims to solve the technical problem that a reset spring in some liquid outlet devices is always in contact with a switching assembly, resulting in the liquid outlet device being unable to switch a liquid path when a liquid driving force is less.

The present disclosure provides a switching mechanism, including:

- a housing assembly, the housing assembly having a liquid inlet flow channel, a mounting cavity, and at least one liquid outlet flow channel, the mounting cavity being communicated between the liquid inlet flow channel and the liquid outlet flow channel, the mounting cavity having a first position and a second position sequentially provided in a first direction, and the first position having multiple switching positions;
- a switching assembly, the switching assembly movably mounted in the mounting cavity, the switching assembly being at least partially located at the first position and configured to be capable of being position-limitedly connected to different switching positions to change an communication/discommunication state between the mounting cavity and the at least one liquid outlet flow channel;
- a reset spring, the reset spring provided in the housing assembly and being capable of generating a driving force for abutting the switching assembly against the first position; and
- a driving member, the driving member movably mounted in the housing assembly, the driving member being configured to be movable relative to the switching assembly in the first direction under an action of an external force, to compress the reset spring, and the switching assembly being driven to move out of one of the multiple switching positions after the driving member moves a certain distance, and at least partially located at the second position, so that the switching assembly is capable of being driven by a liquid entering the mounting cavity from the liquid inlet flow channel to rotate around the first direction until the switching assembly is position-limitedly connected to the housing assembly, and after the external force is withdrawn, the switching assembly capable of being moved out of the second position and position-limitedly connected to another one of the multiple switching positions under an action of the driving force and a limitation of the housing assembly, and the driving member capable of being reset under an action of the reset spring.

In some embodiments of the switching mechanism, the driving member includes an abutment part and a driving part;

- the abutment part is located between the reset spring and the switching assembly, and the driving force is capable of acting on the switching assembly through the abutment part;
- the driving part is capable of driving the abutment part to be separated from the switching assembly and compressing the reset spring by the abutment part, and the driving part drives the switching assembly to move out of one of the multiple switching positions after moving a distance and to be at least partially located at the second position.

In some embodiments of the switching mechanism, the switching assembly is provided with an abutment groove, and the abutment part is movably mounted in the abutment groove;

- the switching assembly is further provided with a passage slot, the passage slot and the abutment groove are coaxially provided in the first direction and communicated with each other, and the driving part passes through the passage slot and abuts against a side of the abutment part facing away from the reset spring.

In some embodiments of the switching mechanism, a groove bottom of the abutment groove is provided with a first positioning groove, and the abutment part is provided with a positioning protrusion positioning-fitted with the first positioning groove.

In some embodiments of the switching mechanism, a driving protrusion is provided on a circumferential outer side of the driving part, after the driving part is moved by a distance, the driving protrusion is capable of abutting against a side of the switching assembly facing away from the abutment part, to drive the switching assembly to move out of one of the multiple switching positions and to be at least partially located at the second position.

In some embodiments of the switching mechanism, a second positioning groove is provided on a side of the switching assembly facing away from the abutment part, and the driving protrusion is capable of being positioning-fitted with the second positioning groove.

In some embodiments of the switching mechanism, the housing assembly is provided with a guide post extending in the first direction, the abutment part and the driving part are provided with a through slot and a guide groove, respectively, and the through slot and the guide groove are guidance-fitted with the guide post.

In some embodiments of the switching mechanism, the housing assembly is provided with a flow guide member, the flow guide member is provided in the mounting cavity, and the flow guide member is configured to guide a liquid to the switching assembly in a certain direction, so as to drive the switching assembly to rotate around the first direction until the switching assembly is position-limitedly connected to the housing assembly;

the flow guide member includes a deflection part and a flow limiting part, the deflection part faces a direction in which a liquid flows into the mounting cavity and is deflected toward the direction, and the flow limiting part is provided between the deflection part and the housing assembly.

In some embodiments of the switching mechanism, the switching assembly has at least one stop member, each stop member is capable of being at least partially located at the second position during a removal of the switching assembly from one of the multiple switching positions;

the housing assembly is provided with at least one first limiting part, the first limiting part is provided in the second position, and a quantity of at least one of the stop members and the first limiting parts is the same as a quantity of the switching positions;

the flow guide member is configured to guide a liquid in a certain direction to the at least one stop member, to drive the switching assembly to rotate around the first direction until the at least one stop member is position-limitedly connected with the first limiting part.

In some embodiments of the switching mechanism, the switching assembly has at least one limit member, the housing assembly is provided with at least one second limiting part, and the second limiting part is provided in the first position;

a quantity of limit members is the same as a quantity of the switching positions, each second limiting part is capable of being position-limitedly connected to a different limit member, so that the switching assembly is position-limitedly connected to a different switching position;

the driving member is configured to be capable of moving relative to the switching assembly in the first direction under an action of an external force, to compress the reset spring, and the switching assembly is driven after the driving member moves a distance, so that the second limiting part is capable of being separated from one of multiple limit members, and the switching assembly is capable of being moved out of one of the multiple switching positions, and each stop member is capable of being least partially located at the second position, so that the switching assembly is capable of being driven by a liquid to rotate around the first direction until at least one stop member is position-limitedly connected with the first limiting part, and after the external force is withdrawn, the switching assembly is capable of being moved out of the second position under an action of the driving force and the limiting of the stop member and the first limiting part that are position-limitedly connected, so that the second limiting part is capable of being position-limitedly connected to another one of the multiple limit members, and the switching assembly is capable of being position-limitedly connected to another one of the multiple switching positions; or the switching assembly has at least one limit member, the housing assembly is provided with at least one second limiting part, and the second limiting part is provided in the first position;

a quantity of second limiting parts is the same as a quantity of the switching positions, each limit member is capable of being position-limitedly connected to different second limiting parts, so that the switching assembly is position-limitedly connected to different switching positions;

the driving member is configured to be capable of moving relative to the switching assembly in the first direction under an action of an external force, to compress the reset spring, and the switching assembly is driven after the driving member moves a distance, so that the limit member is capable of being separated from one of multiple second limiting parts, and the switching assembly is capable of being moved out of one of the multiple switching positions, and each stop member is capable of being least partially located at the second position, so that the switching assembly is capable of being driven by a liquid to rotate around the first direction until at least one stop member is position-limitedly connected with the first limiting part, and after the external force is withdrawn, the switching assembly is capable of being moved out of the second position under an action of the driving force and the limiting of the stop member and the first limiting part that are position-limitedly connected, so that the limit member is capable of being position-limitedly connected to another one of the multiple second limiting parts, and the switching assembly is capable of being position-limitedly connected to another one of the multiple switching positions.

In some embodiments of the switching mechanism, one of the limit member and the second limiting part has a convex structure, and the other of the limit member and the second limiting part has a groove structure, and the convex structure is capable of being accommodated in the groove structure, so that the limit member and the second limiting part are position-limitedly connected.

In some embodiments of the switching mechanism, the convex structure has a first guide surface and a second guide surface, the first guide surface and the second guide surface are provided coaxially with the first direction, the first guide surface spirally rises clockwise around the first direction, and the second guide surface spirally descends clockwise around the first direction;

the groove structure has a first groove bottom and a second groove bottom, the first groove bottom and the second groove bottom are provided coaxially with the first direction, the first groove bottom spirally rises clockwise around the first direction and is capable of being slidably fitted with the first guide surface, and the second groove bottom spirally descends clockwise around the first direction and is capable of being slidably fitted with the second guide surface;

after the external force is withdrawn, the switching assembly is capable of being moved out of the second position under the action of the driving force and the limiting of the stop member and the first limiting part that are position-limitedly connected, the first guide surface is capable of being fitted against the first groove bottom and sliding relative to the first groove bottom, or the second guide surface is capable of being fitted against the second groove bottom and sliding relative to the second groove bottom, so that the convex structure is capable of being accommodated in the groove structure.

In some embodiments of the switching mechanism, the housing assembly is provided with at least one third limiting part, and the third limiting part is provided in the mounting cavity;

the third limiting part and the first limiting part are provided at intervals around the first direction, the third limiting part has a first end and a second end, the first end is provided in the first direction facing the first position, the second end is provided facing away from the first position, the first limiting part has a third end provided facing the first position, a plane where the third end is located is located between the first end and the second end in the first direction;

the stop member is configured to be position-limitedly fitted with the third limiting part after the switching assembly is position-limitedly connected to the different switching position;

during the process of the driving member moving a distance, the convex structure is capable of being separated from the groove structure, and the stop member is capable of being separated from the third limiting part and at least partially located at the second position, so as to be capable of rotating around the first direction under the driving of a liquid until the stop member is position-limitedly fitted with the first limiting part;

after the external force is withdrawn, the switching assembly is capable of being moved out of the second position under an action of the driving force and a limiting of the stop member and the first limiting part that are position-limitedly connected, the stop member is capable of being separated from the first limiting part and the stop member is capable of rotating around the first direction under the driving of a liquid until the stop member is position-limitedly fitted with the third limiting part, the convex structure is capable of being accommodated in the groove structure, so that the switching assembly is position-limitedly connected to another one of the multiple switching positions.

In some embodiments of the switching mechanism, the housing assembly is provided with a liquid dispensing surface facing the second position, and each liquid outlet flow channel is capable of penetrating the liquid dispensing surface to form liquid dispensing holes communicated with the mounting cavity on the liquid dispensing surface;

the switching assembly includes an elastic part, the switching assembly is position-limitedly connected to one of the multiple switching positions, and the elastic part is capable of elastically abutting against the liquid dispensing surface to block at least one of the multiple liquid dispensing holes.

In some embodiments of the switching mechanism, the switching assembly further includes a main body, and the stop member, the limit member, and the elastic part are all provided on the main body.

The present disclosure also provides a liquid outlet device, including the switching mechanism as described above.

An implementation of embodiments of the present disclosure will have the following beneficial effects.

The switching mechanism of the above solutions is applied and equipped to the liquid outlet device, and in addition to having a better liquid path switching effect, the switching mechanism itself can also prevent the reset spring from hindering the rotation of the switching assembly, thereby ensuring the stability of a liquid path switching of the liquid outlet device. Specifically, the switching mechanism includes: a housing assembly having a liquid inlet flow channel, a mounting cavity, and at least one liquid outlet flow channel; a switching assembly; a reset spring; and a driving member. The mounting cavity has a first position and a second position sequentially provided in a first direction. The first position has multiple switching positions. The driving member can move relative to the switching assembly in the first direction under an action of an external force, to compress the reset spring, and the switching assembly is driven to move out of one of the multiple switching positions after the driving member moves a certain distance and to be at least partially located at the second position. In this way, a driving force generated by the reset spring can be prevented from acting on the switching assembly, so that the reset spring does not hinder a rotation of the switching assembly during the rotation of the switching assembly driven by a liquid, and the rotation of the switching assembly can be ensured under a small liquid driving force, thereby ensuring the stability of a liquid path switching of the liquid outlet device.

Other features and advantages of the present disclosure will be set forth in the following specification, and partially become apparent from the specification, or are understood by implementing the present disclosure. Other advantages of the present disclosure can be realized and obtained by embodiments described in the description and the drawings.

BRIEF DESCRIPTION OF THE DRAWINGS

The drawings are used to provide an understanding of the technical solutions of the present disclosure, constitute a part of the specification, and together with the embodiments of the present disclosure, are used to explain the technical solutions of the present disclosure, but do not constitute limitations on the technical solutions of the present disclosure.

Figure 1:
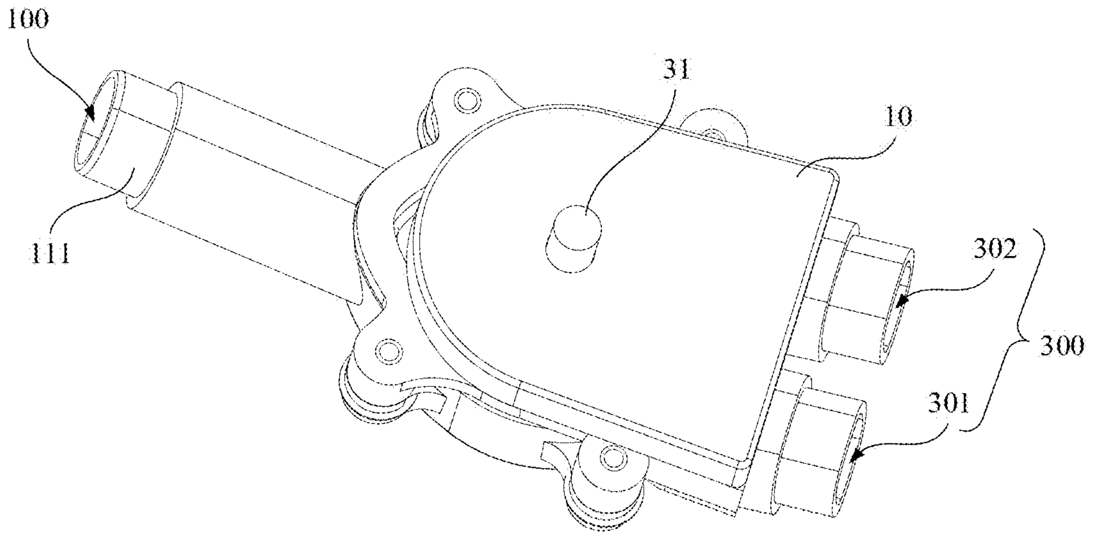
FIG. 1 is a schematic diagram of a structure of a switching mechanism according to an embodiment of the present disclosure.
Figure 2:
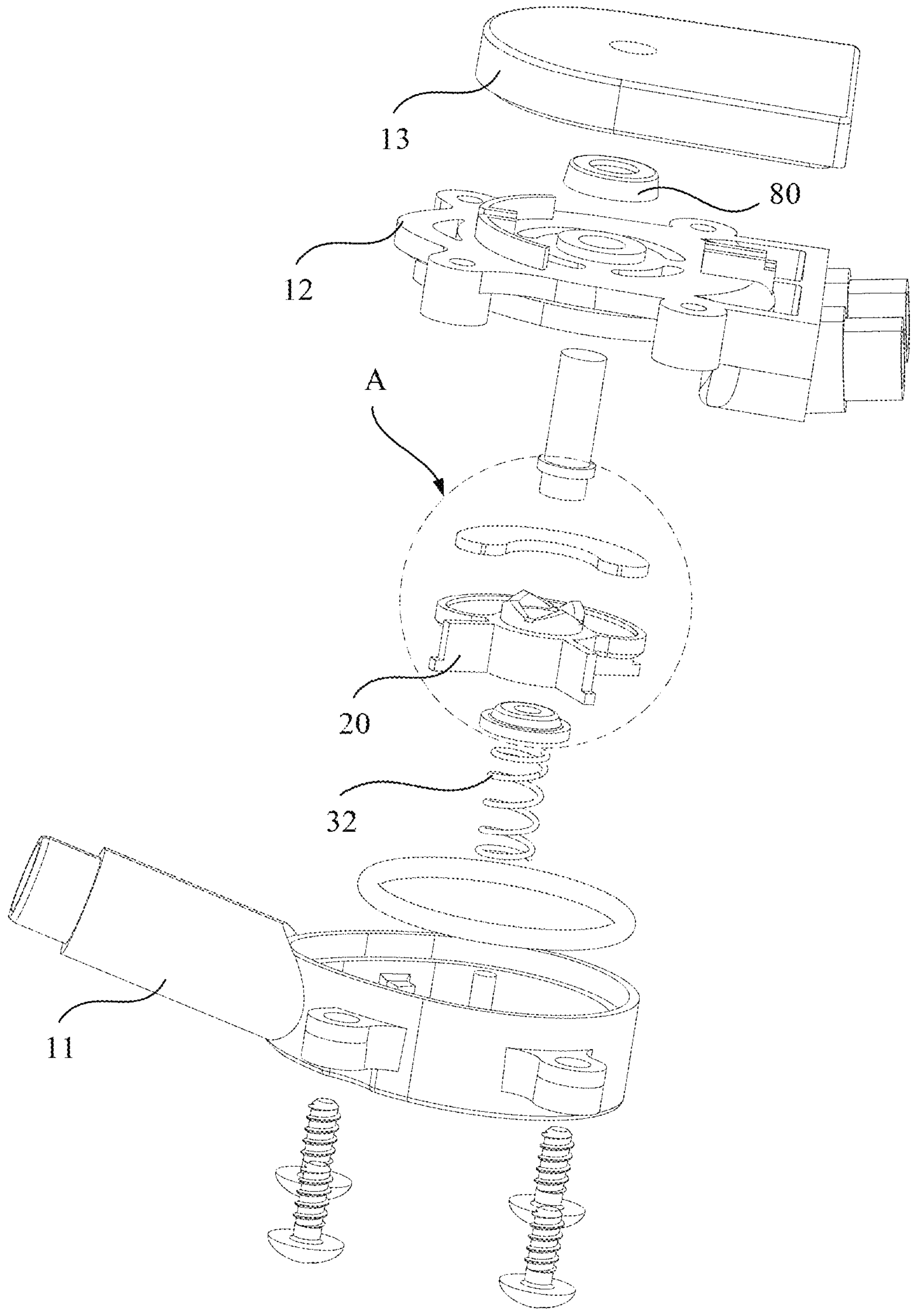
FIG. 2 is an exploded schematic diagram of a structure of the switching mechanism shown in FIG. 1.

Reference signs are described as follows.

10—housing assembly; 11—liquid inlet member; 111—connection part; 12—liquid dispensing member; 13—cover plate; 14—guide post; 20—switching assembly; 21—stop member; 211—blade; 212—stop part; 22—limit member; 221—first guide surface; 222—second guide surface; 23—elastic part; 24—main body; 31—driving member; 311—abutment part; 3111—positioning protrusion; 312—driving part; 3121—driving protrusion; 32—reset spring; 40—flow guide member; 41—deflection part; 42—flow limiting part; 50—first limiting part; 51—third end; 60—second limiting part; 61—first groove bottom; 62—second groove bottom; 70—liquid dispensing surface; 71—annular protrusion; 80—seal member; 90—third limiting part; 91—first end; 100—liquid inlet flow channel; 200—mounting cavity; 201—first position; 202—second position; 300—liquid outlet flow channel; 301—first liquid outlet flow channel; 302—second liquid outlet flow channel; 400—groove structure; 500—liquid dispensing hole; 501—first liquid dispensing hole; 502—second liquid dispensing hole; 600—abutment groove; 601—first positioning groove; 700—passage slot; 800—second positioning groove; 900—through slot; 1000—guide groove.

The realization of the objects, functional features and advantages of the present disclosure are further explained with reference to the accompanying drawings in connection with the embodiments.

DETAILED DESCRIPTION

The present disclosure describes multiple embodiments, but this description is exemplary and not limiting, and it will be apparent to those of ordinary skills in the art that more embodiments and implementations may be included within the scope of the embodiments described by the present disclosure. Although many possible combinations of features are shown in the drawings and discussed in the detailed description, many other combinations of the disclosed features are also possible. Unless specifically limited, any feature or element of any embodiment may be used in combination with, or may substitute for, any other feature or element of any other embodiment.

The present disclosure includes and contemplates combinations with features and elements known to those of ordinary skills in the art. The disclosed embodiments, features, and elements of the present disclosure may also be combined with any conventional features or elements to form a unique inventive solution as defined by the claims. Any feature or element of any embodiment may also be combined with feature(s) or element(s) from other inventive solution to form another unique inventive solution as defined by the claims. Accordingly, it should be understood that any of the features shown and/or discussed in the present disclosure may be implemented alone or in any suitable combination. Thus, the embodiments are not subjected to limitations other than those made in accordance with the appended claims and their equivalent substitutions. In addition, various modifications and changes may be made within the protection scope of the appended claims.

Furthermore, when describing representative embodiments, the specification may have presented a method and/or process as a particular sequence of steps. However, to the extent that the method or process does not depend on the specific order of steps described by the present disclosure, the method or process should not be limited to the specific order of steps. As will be understood by those of ordinary skill in the art, other order of steps is also possible. Accordingly, a particular order of steps set forth in the specification should not be construed as limitations on the claims. Furthermore, the claims for the method and/or process should not be limited to the steps which are performed in the written order. Those skilled in the art can readily understand that these orders can be changed and the changed orders still remain within the spirit and scope of the embodiments of the present disclosure.

In some liquid outlet devices, the switching assembly is generally moved to a liquid driving position, so that the switching assembly can rotate by the driving effect of a liquid to realize the switching of a liquid path. The switching assembly is generally reset by a reset spring, and during the rotation of the switching assembly, the reset spring is always in contact with the switching assembly, which hinders the rotation of the switching assembly. Therefore, when the driving force of a liquid is small, the switching assembly might not rotate, resulting in an inability of the liquid outlet device to switch the liquid path.

Embodiments of the present disclosure provide a switching mechanism and a liquid outlet device. The liquid outlet device can be installed in various occasions and environments, such as companies, schools, homes, and factories, to improve and enhance people's quality of life and hygiene and health. The liquid outlet device may be, but is not limited to, one or more combinations of a water outlet faucet, a shower head, a top sprayer and a spray gun.

Figure 9A:
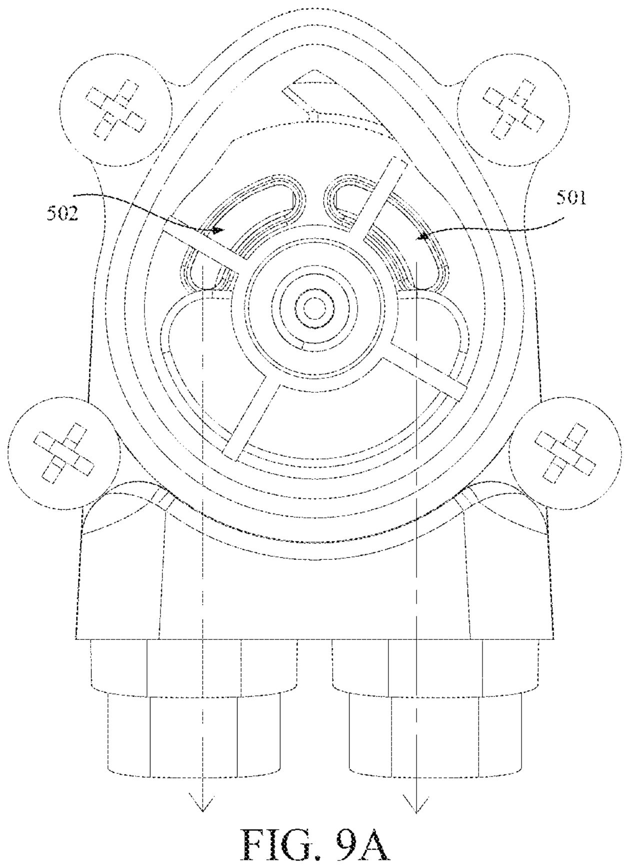
FIGS. 9A to 9D are schematic diagrams of a liquid flow direction of the switching mechanism shown in FIG. 1.
Figure 9B:
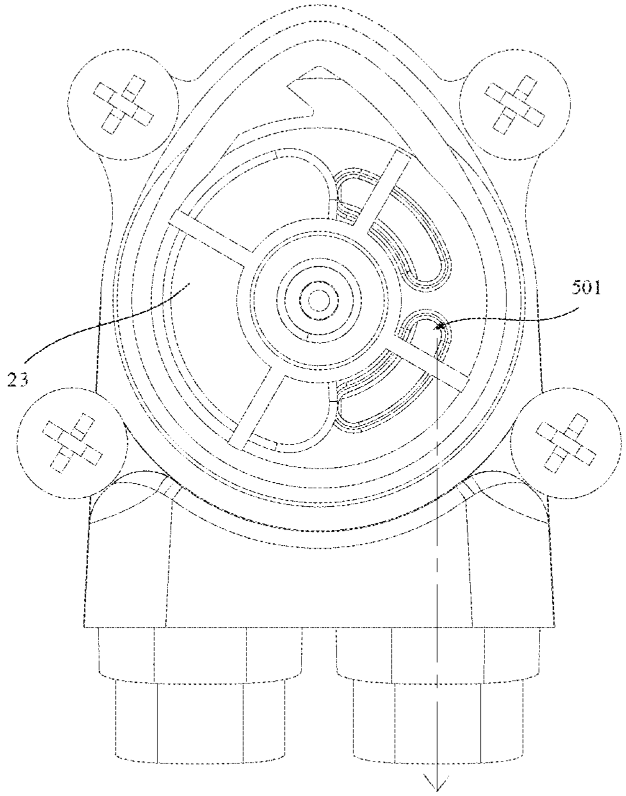
Figure 9C:
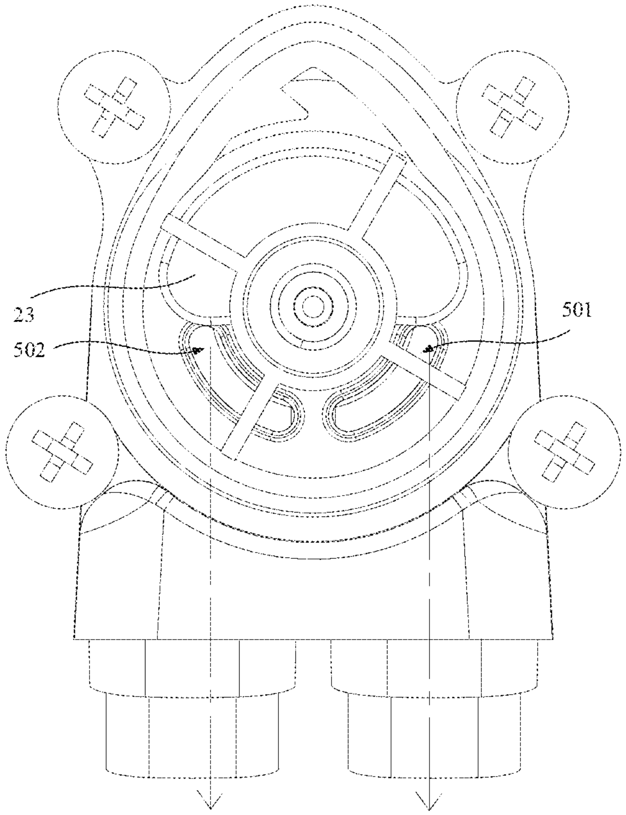
Figure 9D:
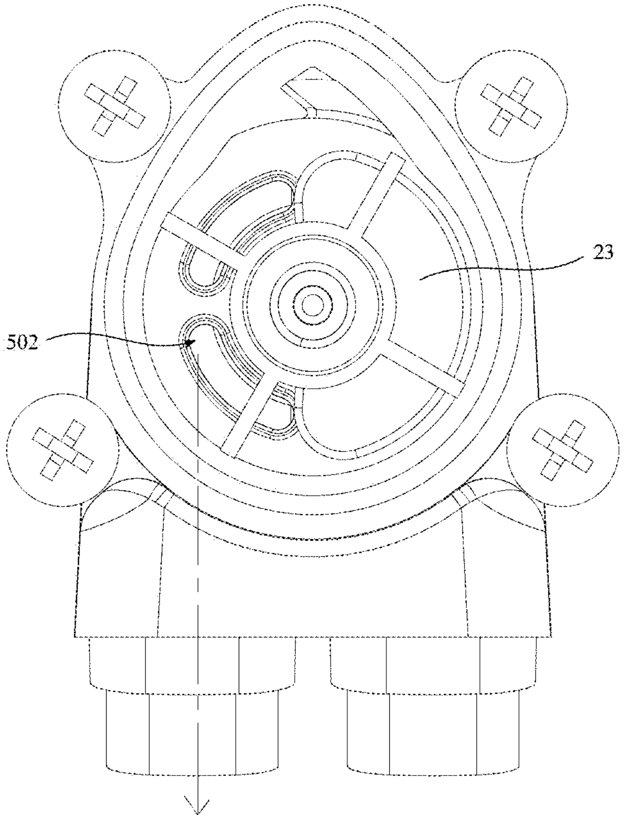

A switching mechanism according to an embodiment of the present disclosure will now be described with reference to FIGS. 1, 2, 4, 5, and 9A to 9D together. The switching mechanism includes a housing assembly 10, a switching assembly 20, a reset spring 32, and a driving member 31. The housing assembly 10 has a liquid inlet flow channel 100, a mounting cavity 200, and at least one liquid outlet flow channel 300. The mounting cavity 200 communicates between the liquid inlet flow channel 100 and the liquid outlet flow channel 300, the mounting cavity 200 has a first position 201 and a second position 202 provided sequentially in the first direction, and the first position 201 has multiple switching positions. In an embodiment of the present disclosure, a quantity of the liquid outlet flow channels 300 is two, namely a first liquid outlet flow channel 301 and a second liquid outlet flow channel 302, respectively. A quantity of switching positions is four, namely a first switching position, a second switching position, a third switching position, and a fourth switching position, respectively. It can be understood that in other embodiments, a quantity of the liquid outlet flow channels 300 may also be other numerical values. The quantity of the switching positions may be other numerical values. The first direction is parallel to a direction pointed by an arrow X in FIG. 4. The switching assembly 20 may be movably mounted in the mounting cavity 200. The switching assembly 20 is at least partially located at the first position 201, and is configured to be capable of being position-limitedly connected to different switching positions to change a communication/discommunication state between the mounting cavity 200 and the at least one liquid outlet flow channel 300. In an embodiment of the present disclosure, the switching assembly 20 is position-limitedly connected to the different switching positions, so that at least one of the two liquid outlet flow channels 300 is capable of discharging liquid. As shown in FIG. 9A, the switching assembly 20 is position-limitedly connected to the first switching position, and the first liquid outlet flow channel 301 and the second liquid outlet flow channel 302 simultaneously discharge liquid. As shown in FIG. 9B, the switching assembly 20 is position-limitedly connected to the second switching position, and only the first liquid outlet flow channel 301 discharges liquid. As shown in FIG. 9C, the switching assembly 20 is position-limitedly connected to the third switching position, and the first liquid outlet flow channel 301 and the second liquid outlet flow channel 302 simultaneously discharge liquid. As shown in FIG. 9D, the switching assembly 20 is position-limitedly connected to the fourth switching position, and only the second liquid outlet flow channel 302 discharges liquid. It can be understood that in other embodiments, the multiple switching positions may further include a fifth switching position. The switching assembly 20 is position-limitedly connected to the fifth switching position, and the first liquid outlet flow channel 301 and the second liquid outlet flow channel 302 stop discharging liquid simultaneously.

The reset spring 32 is provided in the housing assembly 10, and can generate a driving force for abutting the switching assembly 20 against the first position 201, so that the switching assembly 20 is stably at a certain switching position. The reset spring 32 may directly and elastically abut against the switching assembly 20, so as to directly transmit a driving force to the switching assembly 20. The reset spring 32 may elastically abut against the switching assembly 20 by a driving member 31, so as to transmit a driving force to the switching assembly 20 by the driving member 31. The driving member 31 is movably mounted in the housing assembly 10. The driving member 31 is configured to be movable relative to the switching assembly 20 in a first direction under an action of an external force, to compress the reset spring 32, and the switching assembly 20 is driven to move out of one of the multiple switching positions and is at least partially located at the second position 202 after the driving member 31 moves a certain distance, so that the switching assembly 20 can be driven by a liquid entering the mounting cavity 200 from the liquid inlet flow channel 100 to rotate around the first direction until the switching assembly 20 is position-limitedly connected to the housing assembly 10. That is, after the switching assembly 20 is moved out of one of the multiple switching positions, the switching assembly 20 can rotate around the first direction driven by a liquid until the switching assembly 20 is position-limitedly connected to the housing assembly 10, so that after the external force is withdrawn, the switching assembly 20 can be moved out of the second position 202 and position-limitedly connected to another one of the multiple switching positions under an action of the driving force and a limitation of the housing assembly 10, and the driving member 31 can be reset under an action of the reset spring 32. When the switching assembly 20 is driven by a liquid and restricted by the housing assembly 10, the switching assembly 20 can rotate a certain angle, so that when the switching assembly 20 is driven by the reset spring 32 again, the switching assembly 20 can be position-limitedly connected to another one of the multiple switching positions to switch the communication/discommunication state of the liquid outlet flow channel 300. In an embodiment of the present disclosure, the housing assembly 10 is provided with a connection part 111. The connection part 111 may be connected to the external pipeline by, but not limited to, a screw connection, plug-in connection, snap connection, welding, or the like. The external pipeline may be a hose pipe or a rigid pipe. The external pipeline is configured to be capable of supplying liquid to the liquid outlet device. The communication/discommunication state of the external pipeline can be controlled by providing a manually controlled or electrically controlled valve structure, to realize a communication or discommunication between the liquid outlet device and a liquid source. The liquid includes, but is not limited to, clear water or pure water from a municipal water network.

To sum up, an implementation of an embodiment of the present disclosure will have the following beneficial effects: the switching mechanism of the above solution is applied and equipped to the liquid outlet device, and in addition to having a better liquid path switching effect, the switching mechanism itself can also prevent the reset spring 32 from hindering the rotation of the switching assembly 20, thereby ensuring the stability of the liquid path switching of the liquid outlet device. Specifically, the switching mechanism includes a housing assembly 10, a switching assembly 20, a reset spring 32, and a driving member 31, and the housing assembly 10 has a liquid inlet flow channel 100, a mounting cavity 200, and at least one liquid outlet flow channel 300. The mounting cavity 200 has a first position 201 and a second position 202 provided sequentially in a first direction. The first position 201 has multiple switching positions. The driving member 31 can move relative to the switching assembly 20 in the first direction under an action of an external force, to compress the reset spring 32, and the switching assembly 20 is driven to move out of one of the multiple switching positions and is at least partially located at the second position 202 after the driving member 31 moves a certain distance. In this way, the driving force generated by the reset spring 32 can be prevented from acting on the switching assembly 20, so that the reset spring 32 does not hinder the rotation of the switching assembly 20 during the rotation of the switching assembly 20 driven by a liquid, and the rotation of the switching assembly 20 can still be ensured under a less liquid driving force, thereby ensuring the stability of the liquid path switching of the liquid outlet device.

In an exemplary embodiment, referring to FIGS. 3-5, 10A, 11A, 12A, 13A, 14A, and 15A together, the driving member 31 includes an abutment part 311 and a driving part 312. The abutment part 311 is located between the reset spring 32 and the switching assembly 20, and the driving force can act on the switching assembly 20 through the abutment part 311. In this way, an area of the reset spring 32 acting on the switching assembly 20 can be increased by providing the abutment part 311, so that the driving force can more stably act on the switching assembly 20, to abut the switching assembly 20 against the first position 201. The driving part 312 is capable of driving the abutment part 311 to be separated from the switching assembly 20 and compressing the reset spring 32 by the abutment part 311, and the driving part 312 drives the switching assembly 20 to move out of one of the multiple switching positions and be at least partially located at the second position 202 after the driving part 312 moves a certain distance. In this way, the abutment part 311 can resist the driving force generated by the reset spring 32 during the rotation of the switching assembly 20, and the abutment part 311 does not contact with the switching assembly 20, so that a contact surface area between the driving member 31 and the switching assembly 20 can be reduced, and the resistance to the rotation of the switching assembly 20 can be reduced.

Figure 4:
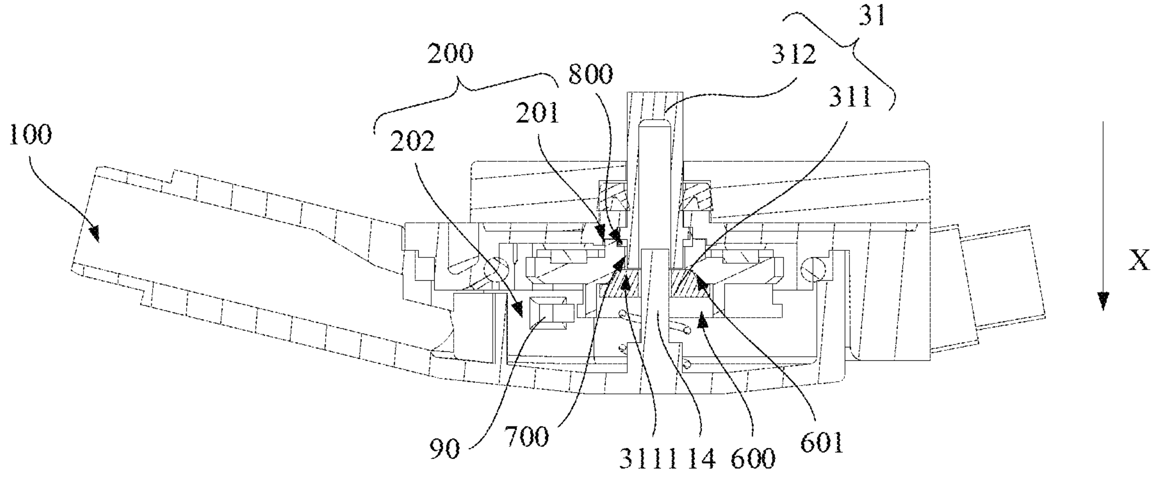
FIG. 4 is a sectional view of the switching mechanism shown in FIG. 1.
Figure 5:
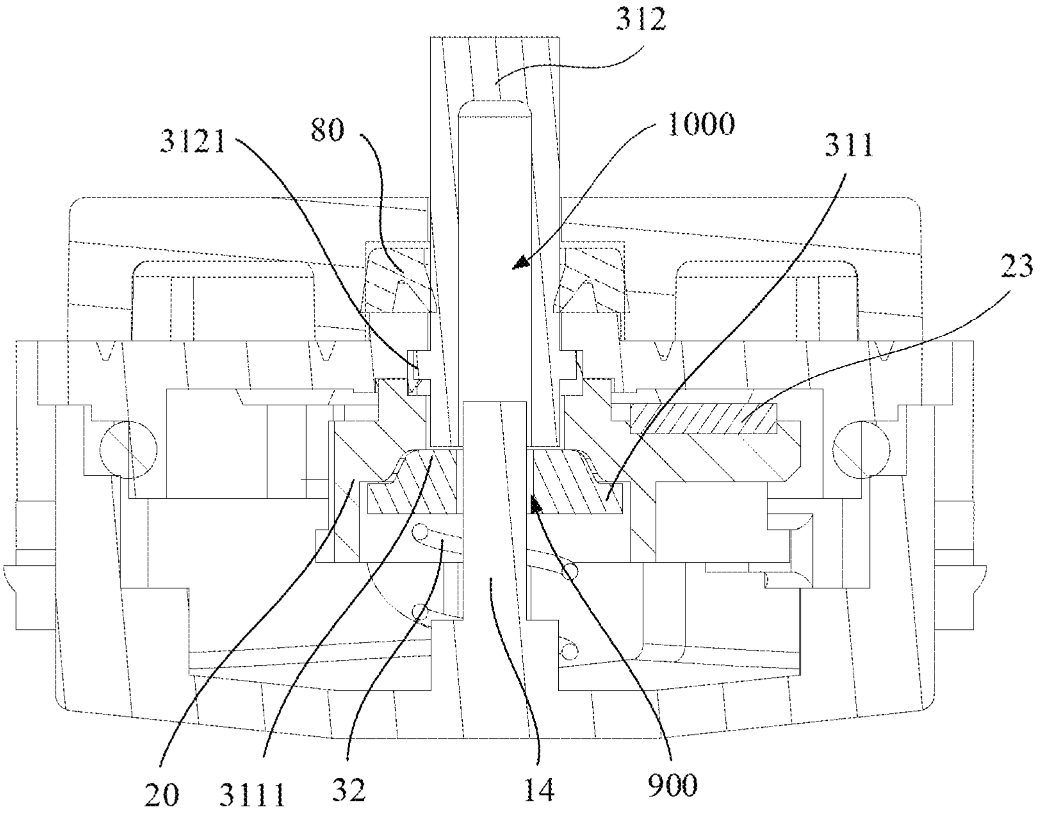
FIG. 5 is a sectional view of the switching mechanism shown in FIG. 1 from another perspective.

In an exemplary embodiment, referring to FIGS. 4 and 5 together, the switching assembly 20 is provided with an abutment groove 600. The abutment part 311 is movably mounted in the abutment groove 600. In this way, by providing the abutment groove 600, the switching assembly 20 can restrict the movement of the abutment part 311, so as to ensure the stability of cooperation between the abutment part 311 and the switching assembly 20, and ensure an accuracy of separation and abutment between the abutment part 311 and the switching assembly 20. The switching assembly 20 is further provided with a passage slot 700. The passage slot 700 and the abutment groove 600 are provided coaxially in the first direction and communicated with each other, and the driving part 312 passes through the passage slot 700 and abuts against a side of the abutment part 311 facing away from the reset spring 32. In this way, by providing the passage slot 700, the switching assembly 20 can restrict the movement of the driving part 312 to ensure a fitting accuracy between the driving part 312 and the abutment part 311. In an embodiment of the present disclosure, the driving part 312 has a cylindrical shape and is partially exposed from the housing assembly 10 to facilitate driving by an external force. The abutment part 311 has a disk shape, which ensures that there is a large contact surface area between the abutment part 311 and the switching assembly 20, and ensures the stability of transmission of the driving force. Further, since the abutment part 311 is disk-shaped, the abutment part 311 has a large area facing the reset spring 32, and the stability of the abutment part 311 compressing the reset spring 32 is ensured.

In an exemplary embodiment, with continued reference to FIGS. 4 and 5, a groove bottom of the abutment groove 600 is provided with a first positioning groove 601, and the abutment part 311 is provided with a positioning protrusion 3111 positioning-fitted with the first positioning groove 601. In this way, by providing the first positioning groove 601 and the positioning protrusion 3111, it is possible to further improve the abutment accuracy between the abutment part 311 and the switching assembly 20, and prevent the abutment part 311 from moving relative to the switching assembly 20 during the abutment process, which affects the communication/discommunication state between the mounting cavity 200 and the liquid outlet flow channel 300. In an embodiment of the present disclosure, the positioning protrusion 3111 has a truncated cone shape, and a small end face of the positioning protrusion 3111 faces the first positioning groove 601. There are rounded transitions between the small end face and a circumferential wall of the positioning protrusion 3111, and between the circumferential wall and the abutment part 311. A shape of the first positioning groove 601 matches a shape of the positioning protrusion 3111.

Figure 3:
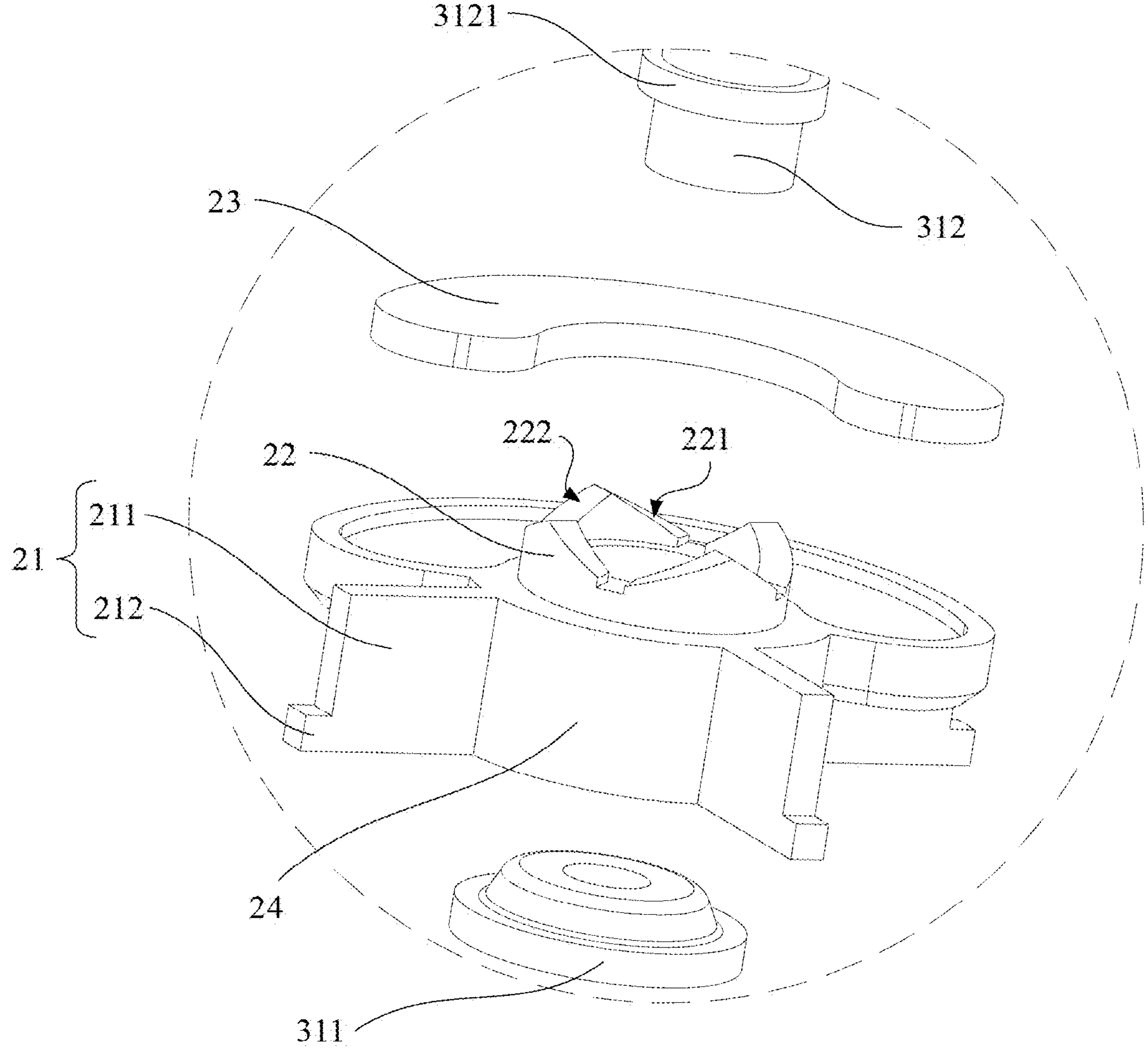
FIG. 3 is an enlarged schematic diagram of a structure of Part A in FIG. 2.

In an exemplary embodiment, referring to FIGS. 3 to 5 together, a driving protrusion 3121 is provided on a circumferential outer side of the driving part 312, and after the driving part 312 is moved by a certain distance, the driving protrusion 3121 can abut against a side of the switching assembly 20 facing away from the abutment part 311 to drive the switching assembly 20 to move out of one of the multiple switching positions and be at least partially located at the second position 202. In an embodiment of the present disclosure, the driving protrusion 3121 is annular and is located at the circumferential outer side of the driving part 312 around the first direction, so that the external force can be more uniformly transmitted to the switching assembly 20 through the driving protrusion 3121, and the stability of moving the switching assembly 20 in the first direction is ensured. When the driving part 312 is in an initial state, the driving protrusion 3121 can be provided at an interval from the switching assembly 20, to ensure that the reset spring 32 is first compressed and then the switching assembly 20 moves in the first direction under the action of the driving member 31, thereby preventing the reset spring 32 from hindering the rotation of the switching assembly 20.

In an exemplary embodiment, with continued reference to FIGS. 3 to 5, a second positioning groove 800 is provided on a side of the switching assembly 20 facing away from the abutment part 311, and the driving protrusion 3121 can be positioning-fitted with the second positioning groove 800. Thus, by providing the second positioning groove 800, the switching assembly 20 can restrict the movement of the driving protrusion 3121 to ensure a fitting accuracy between the driving protrusion 3121 and the switching assembly 20. In an embodiment of the present disclosure, the passage slot 700 can penetrate a groove bottom of the second positioning groove 800 to form an annular surface surrounding the passage slot 700. The driving protrusion 3121 is capable of abutting against the annular surface to drive the switching assembly 20 to move out of one of the multiple switching positions and be at least partially located at the second position 202.

In an exemplary embodiment, referring to FIGS. 4 and 5 together, the housing assembly 10 is provided with a guide post 14 extending in the first direction, and the abutment part 311 and the driving part 312 are provided with a through slot 900 and a guide groove 1000, respectively, which are guidance-fitted with the guide post 14. In this way, the movement accuracy between the abutment part 311 and the driving part 312 can be further improved by the guidance-fit between the through slot 900 and the guide groove 1000 and the guide post 14. The guide post 14 can penetrate through the through slot 900 and partially protrude into the guide groove 1000. In an embodiment of the present disclosure, the reset spring 32 is a coil spring and is sleeved on the guide post 14, so that a stability of elastic deformation of the reset spring 32 and a directional accuracy of an elastic force generated by the reset spring 32 can be ensured.

Figure 6:
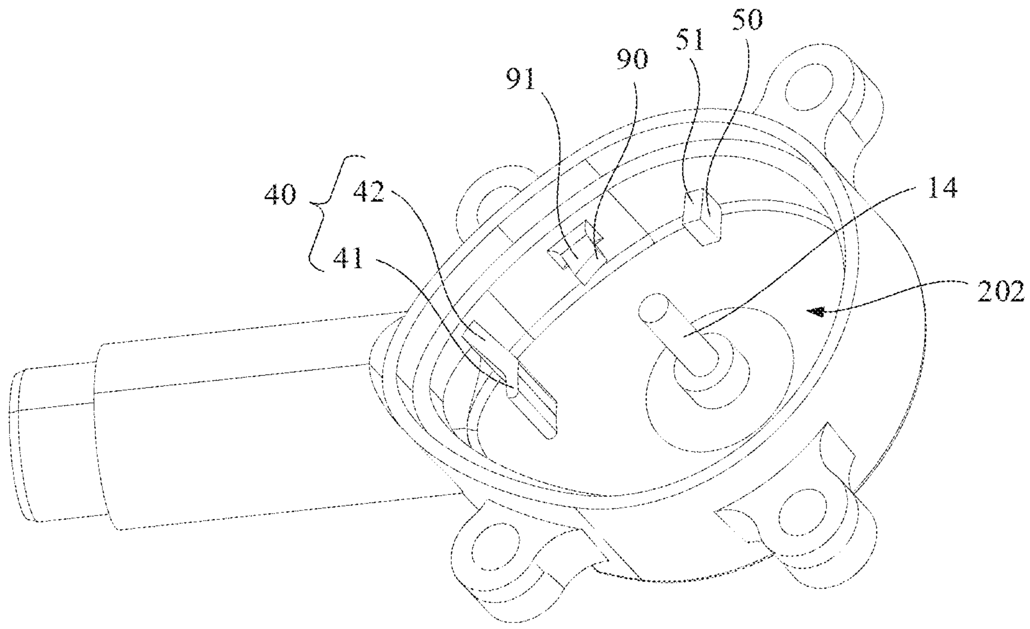
FIG. 6 is a schematic diagram of a structure of a liquid inlet member of the switching mechanism shown in FIG. 1.

In an exemplary embodiment, as shown in FIG. 6, the housing assembly 10 is provided with a flow guide member 40, the flow guide member 40 is provided in the mounting cavity 200, and the flow guide member 40 is configured to guide a liquid to the switching assembly 20 in a certain direction to drive the switching assembly 20 to rotate around the first direction until the switching assembly 20 is position-limitedly connected to the housing assembly 10. In this way, an arrangement of the flow guide member 40 can make a liquid have a certain flow direction, which facilitates driving the switching assembly 20 to rotate around the first direction. In an embodiment of the present disclosure, the flow guide member 40 includes a deflection part 41 and a flow limiting part 42, and the deflection part 41 faces a direction in which a liquid flows into the mounting cavity 200, and deflects toward the direction, so that when a liquid hits the deflection part 41, it can generate a liquid flow flowing clockwise or a liquid flow flowing counterclockwise around an axial direction of the switching assembly 20 along a shape of the deflection part 41. The flow limiting part 42 is provided between the deflection part 41 and the housing assembly 10 to restrict the flow of one of the clockwise flowing liquid flow and the counterclockwise flowing liquid flow, so that a liquid in the mounting cavity 200 can drive the switching assembly 20 to rotate around the first direction substantially according to the flow direction of the other of the clockwise flowing liquid flow and the counterclockwise flowing liquid flow. The flow limiting part 42 may have, but is not limited to, a lath structure, as long as it may stop the flow of liquid. In an embodiment of the present disclosure, referring to FIGS. 10B, 11B, 12B, 13B, 14B, and 15B together, an arrangement of the deflection part 41 is also able to leave space for the movement of the switching assembly 20 along the first direction and the rotation of the switching assembly 20 around the first direction. Furthermore, the deflection part 41 can also abut against the switching assembly 20 to ensure a stability of the switching assembly 20 moving in the first direction and rotating around the first direction.

In an exemplary embodiment, referring to FIGS. 3, 6, 10B, 11B, 12B, 13B, 14B, and 15B together, the switching assembly 20 has at least one stop member 21, each stop member 21 is at least partially located at the second position 202 during a removal of the switching assembly 20 from one of multiple switching positions. The housing assembly 10 is provided with at least one first limiting part 50, the first limiting part 50 is provided at the second position 202, a quantity of at least one of the stop members 21 and the first limiting parts 50 is the same as a quantity of the switching positions, in this way, it can be ensured that a quantity of the limit-fitting positions between the switching assembly 20 and the housing assembly 10 at the second position 202 around the first direction can be the same as a quantity of the switching positions. In an embodiment of the present disclosure, a quantity of the stop members 21 is consistent with a quantity of the switching positions, and each of them is four. A quantity of the first limiting part 50 is one. Since the first limiting part 50 is provided on the movement path of the switching assembly 20 and protrudes from the housing assembly 10, there is a stopping effect on a liquid. Therefore, a smaller quantity of the first limiting parts 50 is beneficial for a liquid to flow according to the guidance of the flow guide member 40. It can be understood that in other embodiments, a quantity of the first limiting parts 50 may also be two, three, or four. The flow guide member 40 is configured to guide a liquid in a certain direction to the at least one stop member 21 to drive the switching assembly 20 to rotate around the first direction until the at least one stop member 21 is position-limitedly connected with the first limiting part 50. In this way, on one hand, the stop member 21 can form a limited fit with the first limiting part 50, and on the other hand, an area of the switching assembly 20 stopping a liquid can be increased, which is beneficial to rotation around the first direction under the driving action of a liquid. Since the stop member 21 is beneficial for the liquid to drive the switching assembly 20, the larger quantity of the stop members 21 is beneficial for at least one stop member 21 to be in contact with a liquid close to the upstream of a liquid flow, to obtain a greater driving force. In an embodiment of the present disclosure, the stop member 21 includes a blade 211 and a stop part 212 located on the circumferential outer side of the blade 211. The blade 211 can ensure that the stop member 21 has a sufficient area to contact with a liquid. The stop part 212 can ensure the limit accuracy and stability between the stop member 21 and the first limiting part 50.

Figure 7:
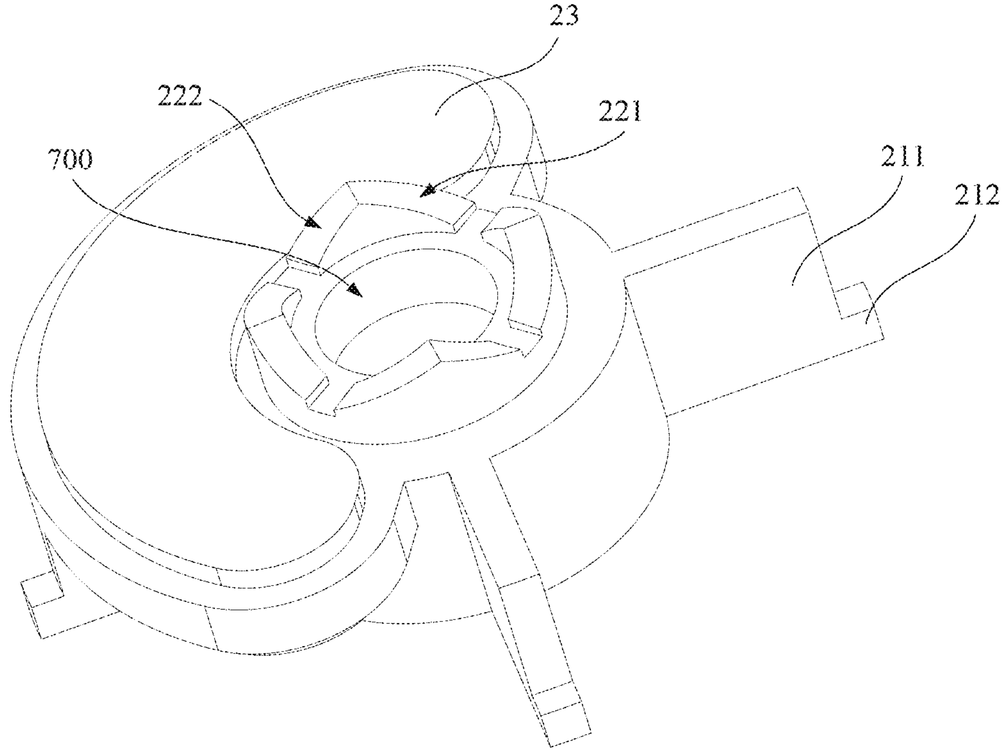
FIG. 7 is a schematic diagram of a structure of a switching assembly of the switching mechanism shown in FIG. 1.
Figure 8:
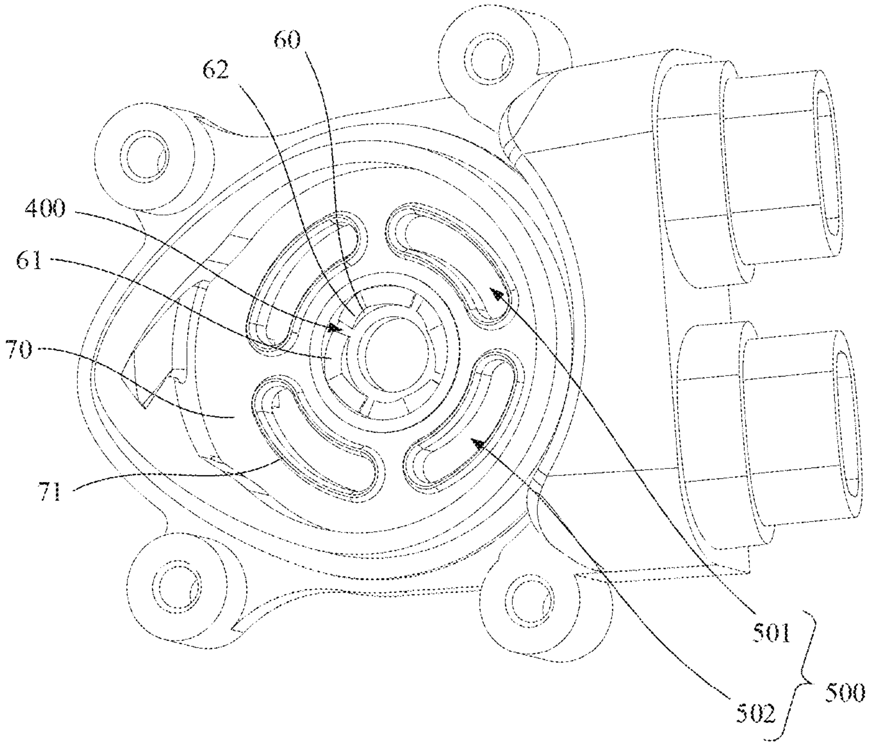
FIG. 8 is a schematic diagram of a structure of a liquid dispensing member of the switching mechanism shown in FIG. 1.

In an exemplary embodiment, referring to FIGS. 3, 7, and 8 together, the switching assembly 20 has at least one limit member 22. The housing assembly 10 is provided with at least one second limiting part 60. The limiting part 60 is provided at the first position 201. A quantity of the limit members 22 is the same as a quantity of the switching positions, which can ensure that a quantity of the limit-fitting positions of the limit members 22 and the second limiting parts 60 is consistent with the quantity of the switching positions. The limit-fitting positions of the limit members 22 and the second limiting parts 60 may not coincide with the switching positions. Each second limiting part 60 can be position-limitedly connected to a different limit member 22, so that the switching assembly 20 is position-limitedly connected to different switching positions. The driving member 31 is configured to movable relative to the switching assembly 20 in the first direction under an action of an external force, to compress the reset spring 32, and the switching assembly 20 is driven after the driving member 31 moves a certain distance, so that the second limiting part 60 can be separated from one of the multiple limit members 22, and the switching assembly 20 can be moved out of one of the multiple switching positions. Each stop member 21 can be at least partially located at the second position 202, so that the switching assembly 20 can rotate around the first direction under the driving of the liquid until at least one stop member 21 is position-limitedly connected with the first limiting part 50. After the external force is withdrawn, the switching assembly 20 can be moved out of the second position 202 under the action of the driving force and the limiting of the stop member 21 and the first limiting part 50 that are position-limitedly connected, so that the second limiting part 60 can be position-limitedly connected to another one of the multiple limit members 22, and the switching assembly 20 can be position-limitedly connected to another one of the multiple switching positions. In this way, the switching position of the switching assembly 20 can be switched once, thereby completing the switching of the liquid path once. As shown in FIGS. 9A to 9D, after the above-described switching process is repeated multiple times, the switching assembly 20 can return to the initial switching position. In an embodiment of the present disclosure, a quantity of the limit members 22 is four, and a quantity of the second limiting parts 60 is four. It can be understood that in other embodiments, the quantity of the second limiting parts 60 may also be two, three, or four, so that two limit members 22, three limit members 22, or four limit members 22 can be simultaneously position-limitedly connected to the corresponding second limiting parts 60, and a limit stability of the switching assembly 20 in the switching positions is improved.

In another exemplary embodiment, the switching assembly 20 has at least one limit member 22, the housing assembly 10 is provided with at least one second limiting part 60, and the second limiting part 60 is provided in the first position 201. The quantity of the second limiting parts 60 is the same as a quantity of the switching positions, which ensures that a quantity of the limit-fitting positions between the limit members 22 and the second limiting parts 60 is consistent with the quantity of the switching positions. The limit-fitting positions between the limit members 22 and the second limiting parts 60 may not coincide with the switching positions. The switching positions may also be located at the second limiting part 60, so that the limit-fitting positions between the limit members 22 and the second limiting parts 60 are coincide with the switching positions. Each limit member 22 can be position-limitedly connected to a different second limiting part 60, so that the switching assembly 20 is position-limitedly connected to different switching positions. The driving member 31 is configured to movable relative to the switching assembly 20 in the first direction under an action of an external force, to compress the reset spring 32. The switching assembly 20 is driven after the driving member 31 moves a certain distance, so that the limit member 22 can be separated from one of the multiple second limiting parts 60, and the switching assembly 20 can be moved out of one of the multiple switching positions. Each stop member 21 can be at least partially located at the second position 202, so that the switching assembly 20 can rotate around the first direction under the driving of the liquid until at least one stop member 21 is position-limitedly connected with the first limiting part 50. After the external force is withdrawn, the switching assembly 20 can be moved out of the second position 202 under the action of the driving force and the limiting of the stop member 21 and the first limiting part 50 that are position-limitedly connected, so that the limit member 22 can be position-limitedly connected to another one of the multiple second limiting parts 60, and the switching assembly 20 can be position-limitedly connected to another one of the multiple switching positions. In this way, the switching position of the switching assembly 20 can be switched once, thereby completing the switching of the liquid path once. After the above-described switching process is repeated multiple times, the switching assembly 20 can return to the initial switching position. Since each stop member 21 can be at least partially located at the second position 202 during the driving member 31 driving the switching assembly 20 to move out of one of the multiple switching positions, and the reset spring 32 can drive the switching assembly 20 and the switching assembly 20 can be moved out of the second position 202 under the limiting of the stop member 21 and the first limiting part 50 that are position-limitedly connected, that is, before the switching assembly 20 is completely moved out of one of the multiple switching positions and before the switching assembly 20 is completely moved out of the second position 202, the switching assembly 20 is limited by the housing assembly 10, so that the movement accuracy of the switching assembly 20 is ensured, and thus the accuracy of the liquid path switching is ensured.

In an exemplary embodiment, referring to FIGS. 3, 7, and 8 together, one of the limit member 22 and the second limiting part 60 has a convex structure, and the other of the limit member 22 and the second limiting part 60 has a groove structure 400. The convex structure can be accommodated in the groove structure 400, so that the limit member 22 and the second limiting part 60 are position-limitedly connected. In an embodiment of the present disclosure, the limit member 22 has a convex structure. The second limiting part 60 has a groove structure 400. The convex structure has a first guide surface 221 and a second guide surface 222, the first guide surface 221 and the second guide surface 222 are provided coaxially with the first direction, the first guide surface 221 spirally rises clockwise around the first direction, and the second guide surface 222 spirally descends clockwise around the first direction, so that the adjacent positions between the first guide surface 221 and the second guide surface 222 can form an outwardly convex tip. The groove structure 400 has a first groove bottom 61 and a second groove bottom 62, the first groove bottom 61 and the second groove bottom 62 are provided coaxially with the first direction, the first groove bottom 61 spirally rises clockwise around the first direction and can be slidably fitted with the first guide surface 221, and the second groove bottom 62 spirally descends clockwise around the first direction and can be slidably fitted with the second guide surface 222, so that the first groove bottom 61 and the second groove bottom 62 can form a groove that accommodates the outwardly convex tip. After the external force is withdrawn, the switching assembly 20 can be moved out of the second position 202 under the action of the driving force and the limiting of the stop member 21 and the first limiting part 50 that are position-limitedly connected, the first guide surface 221 can be fitted against the first groove bottom 61 and slide relative to the first groove bottom 61, or the second guide surface 222 can be fitted against the second groove bottom 62 and slide relative to the second groove bottom 62, so that the convex structure can be accommodated in the groove structure 400, and the accuracy of the limited connection between the limit member 22 and the second limiting part 60 can be ensured, and thus the stability of the liquid path switching is ensured. In an embodiment of the present disclosure, a quantity of the convex structures is four, and correspondingly, a quantity of the groove structures 400 is four, which ensures a fitting accuracy between the switching assembly 20 and the housing assembly 10.

In an exemplary embodiment, referring to FIGS. 4, 5, 6, and 10A-15B together, the housing assembly 10 is provided with at least one third limiting part 90, and the third limiting part 90 is provided in the mounting cavity 200. In an embodiment of the present disclosure, a quantity of the third limiting part 90 is one. The third limiting part 90 and the first limiting part 50 are provided at intervals around the first direction, the third limiting part 90 has a first end 91 and a second end, the first end is provided in the first direction facing the first position 201, and the second end is provided facing away from the first position 201. The first limiting part 50 has a third end 51 provided facing the first position 201. The plane where the third end 51 is located is located between the first end 91 and the second end in the first direction, so that the third limiting part 90 and the first limiting part 50 are partially overlapped in a direction around the first direction. It is convenient for the switching assembly 20 to be disengaged from a restriction of one of the third limiting part 90 and the first limiting part 50 and be restricted by the other of the third limiting part 90 and the first limiting part 50 after rotating a certain angle. During a liquid path switching process, the switching assembly 20 moves back and forth in the first direction once and completes two angular rotations, which avoids the switching assembly 20 completing the liquid path switching by rotating only once during the liquid path switching process, which results in excessive rotation angle of the switching assembly 20, causing a greater impact on the housing assembly 10. The stop member 21 is configured to be position-limitedly fitted with the third limiting part 90 after the switching assembly 20 is position-limitedly connected to the different switching positions. In this way, after the switching assembly 20 is position-limitedly connected to the different switching positions, the switching assembly 20 can be simultaneously limited by the stop member 21 and the third limiting part 90 as well as the limit member 22 and the first limiting part 50, which further ensures that the switching assembly 20 is stably in a certain switching position. During the process of the driving member 31 moving a certain distance, the convex structure can be separated from the groove structure 400, and the stop member 21 can be separated from the third limiting part 90 and at least partially located at the second position 202, to be able to rotate around the first direction under the driving of a liquid until the stop member 21 is position-limitedly fitted with the first limiting part 50. After the external force is withdrawn, the switching assembly 20 can be moved out of the second position 202 under the action of the driving force and the limiting of the stop member 21 and the first limiting part 50 that are position-limitedly connected, the stop member 21 can be separated from the first limiting part 50 and the stop member 21 can rotate around the first direction under the driving of a liquid until the stop member 21 is position-limitedly fitted with the third limiting part 90. The convex structure can be accommodated in the groove structure 400, so that the switching assembly 20 is position-limitedly connected to another one of the multiple switching positions.

In an exemplary embodiment, referring to FIGS. 3, 5, 7, 8, 9A-9D, and 10A-15B together, the housing assembly 10 is provided with a liquid dispensing surface 70 facing the second position 202, and each liquid outlet flow channel 300 can penetrate the liquid dispensing surface 70 to form a liquid dispensing hole 500 communicated with the mounting cavity 200 on the liquid dispensing surface 70. In an embodiment of the present disclosure, a quantity of the liquid outlet flow channels 300 is two, which are a first liquid outlet flow channel 301 and a second liquid outlet flow channel 302, respectively. The first liquid outlet flow channel 301 can form a first liquid dispensing hole 501 communicating with the mounting cavity 200 on the liquid dispensing surface 70. The second liquid outlet flow channel 302 can form a second liquid dispensing hole 502 communicating with the mounting cavity 200 on the liquid dispensing surface 70. The switching assembly 20 includes an elastic part 23. The switching assembly 20 is position-limitedly connected to one of the multiple switching positions, and the elastic part 23 can elastically abut against the liquid dispensing surface 70 to block at least one of the multiple liquid dispensing holes 500. In this way, by providing the elastic part 23, it is possible to better adhere to the liquid dispensing surface 70 by utilizing the elastic deformability of the elastic part 23, and the elastic part 23 can be partially accommodated in the first liquid dispensing hole 501 when passing through the first liquid dispensing hole 501, thereby increasing a sealing area of the first liquid dispensing hole 501 and improving the blocking effect. Similarly, when the elastic part 23 passes through the second liquid dispensing hole 502, the elastic part 23 can be partially accommodated in the second liquid dispensing hole 502, thereby increasing a sealing area of the second liquid dispensing hole 502 and improving the blocking effect. In an embodiment of the present disclosure, the elastic part 23 may be made of an elastomer material.

In an embodiment of the present disclosure, referring to FIG. 1, FIG. 2, FIG. 4, FIG. 5, FIG. 6, and FIG. 8 together, the housing assembly 10 includes a liquid inlet member 11, a liquid dispensing member 12, and a cover plate 13. The liquid inlet member 11 and the liquid dispensing member 12 enclose a mounting cavity 200, and the liquid inlet flow channel 100, the flow guide member 40, the first limiting part 50, the third limiting part 90, and the guide post 14 are provided in the liquid inlet member 11. The liquid dispensing surface 70 and the second limiting part 60 are provided in the liquid dispensing member 12. The liquid dispensing member 12 and the cover plate 13 enclose a liquid outlet flow channel 300.

An annular protrusion 71 is provided on a side of the liquid dispensing surface 70 facing the elastic part 23, and the annular protrusion 71 is provided on the circumferential outer side of each liquid dispensing hole 500. In this way, by providing the annular protrusion 71, the degree of deformation of the elastic part 23 can be increased when the elastic part 23 abuts against the liquid dispensing surface 70, and at least a side of the annular protrusion 71 away from the liquid dispensing surface 70 can be wrapped to form a sealing structure surrounding the circumferential outer side of the liquid dispensing hole 500, thereby further improving the blocking effect of the elastic part 23 on the liquid dispensing hole 500. In order to improve the sealing performance of the housing assembly 10, a seal member 80 is further provided at a position where the driving part 312 extends out of the housing assembly 10. The housing assembly 10 is provided with a mounting groove. The seal member 80 is sleeved on the driving part 312 and accommodated in the mounting groove.

In an exemplary embodiment, referring to FIGS. 3 to 5 and FIG. 7 together, the switching assembly 20 further includes a main body 24. The stop member 21, the limit member 22, and the elastic part 23 are all provided on the main body 24. The stop member 21 is located on a side of the main body 24 facing the second position 202. The limit member 22 and the elastic part 23 are located on a side of the main body 24 facing the first position 201. A connection groove is further provided on a side of the main body 24 facing the first position 201, and the elastic part 23 is installed in the connection groove. In an embodiment of the present disclosure, the main body 24 may be made of a hard material, to improve the strength of the switching assembly 20 and ensure the accuracy of liquid path switching.

Figure 10A:
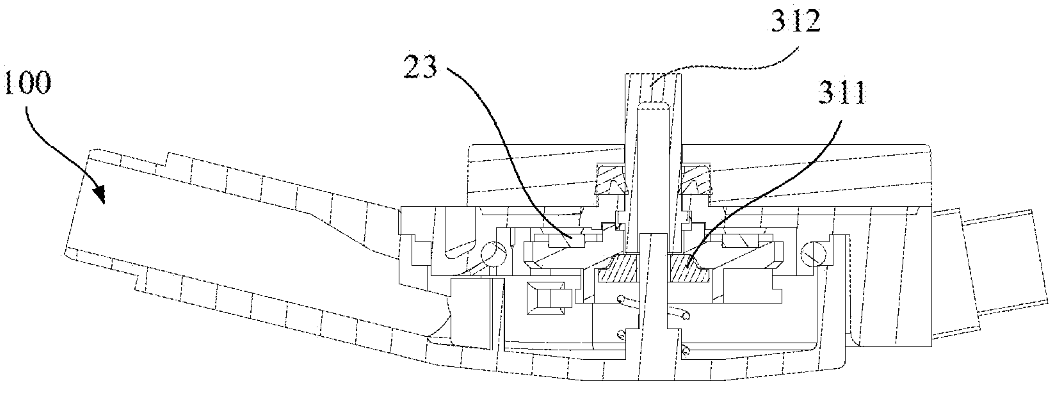
FIGS. 10A and 10B are sectional views of the switching mechanism shown in FIG. 1, in which the switching assembly is position-limitedly connected to one of multiple switching positions.
Figure 10B:
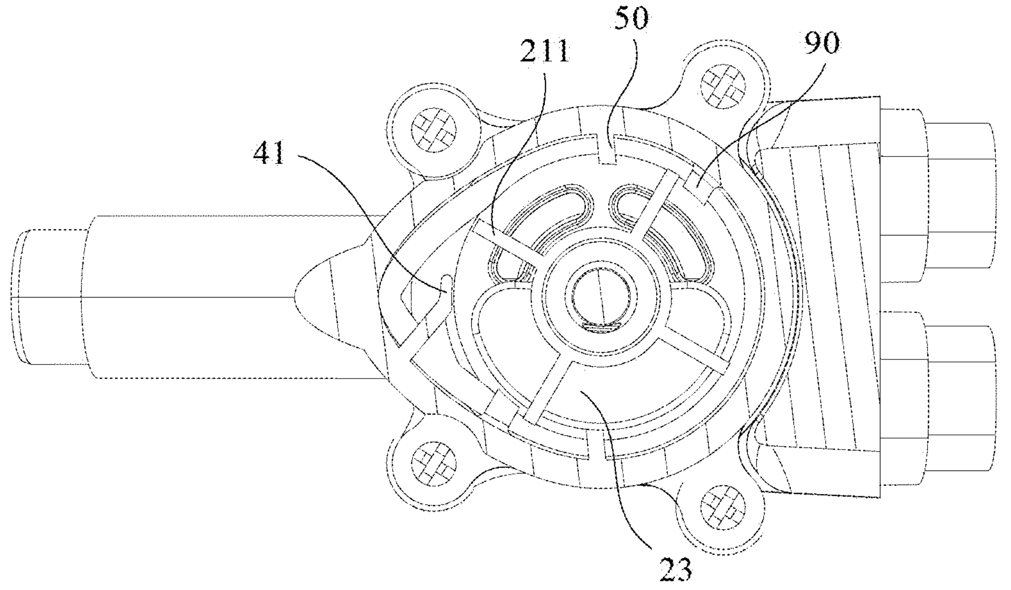
Figure 11A:
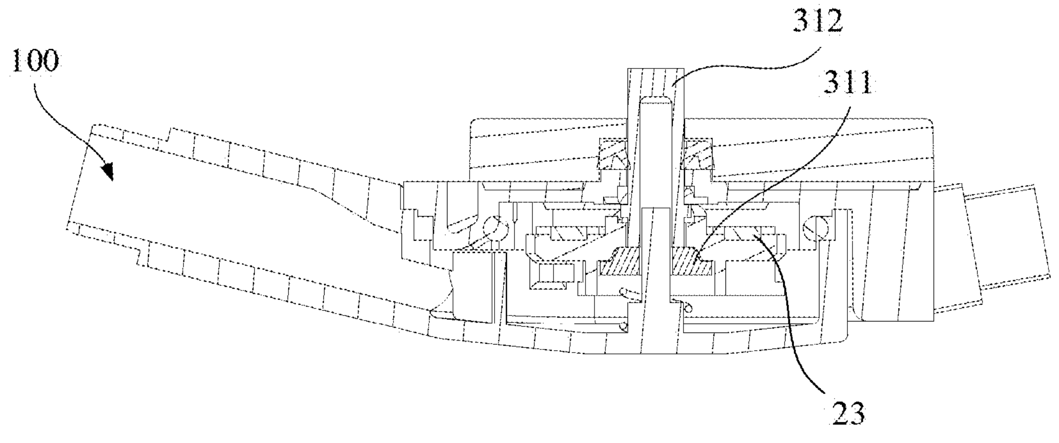
FIGS. 11A and 11B are sectional views of the switching mechanism shown in FIG. 1, in which the stop member gradually disengages from a restriction of a third limiting part.
Figure 11B:
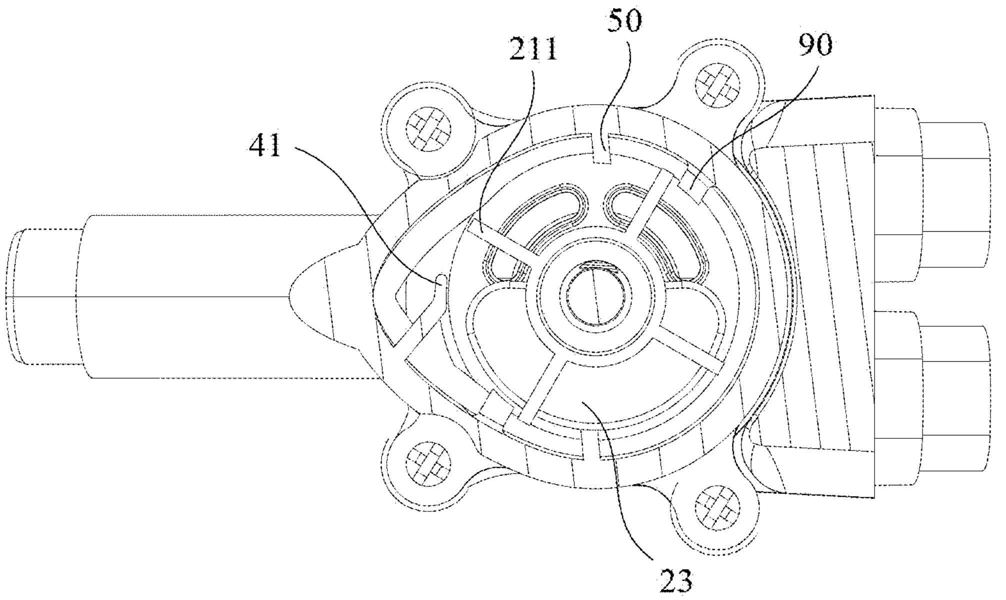
Figure 12A:
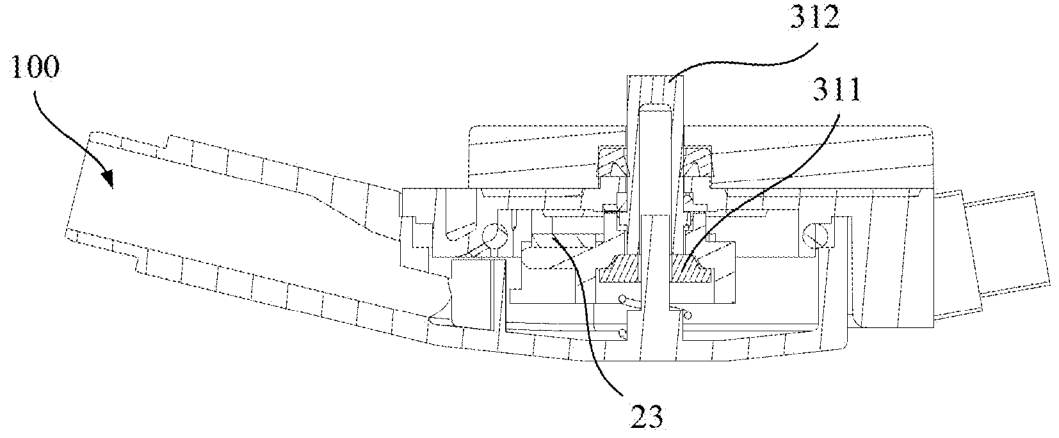
FIGS. 12A and 12B are sectional views of the switching mechanism shown in FIG. 1, in which the stop member is restricted by a first limiting part.
Figure 12B:
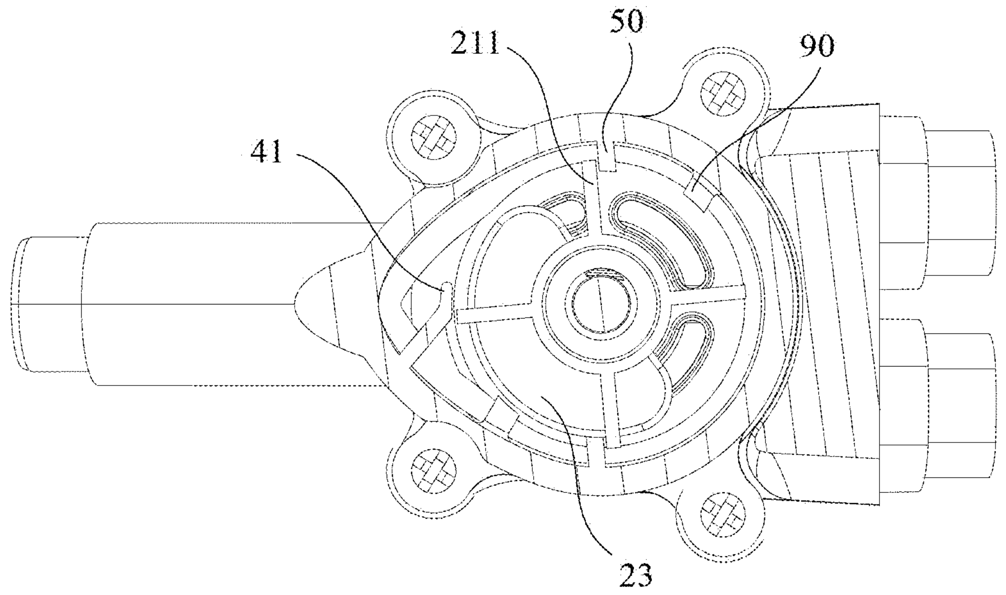
Figure 13A:
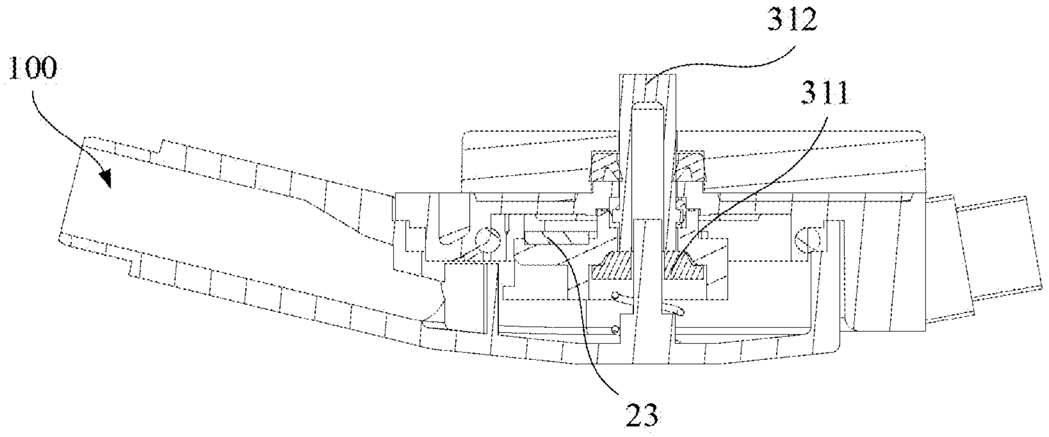
FIGS. 13A and 13B are sectional views of the switching mechanism shown in FIG. 1, in which the stop member gradually disengages from a restriction of the first limiting part.
Figure 13B:
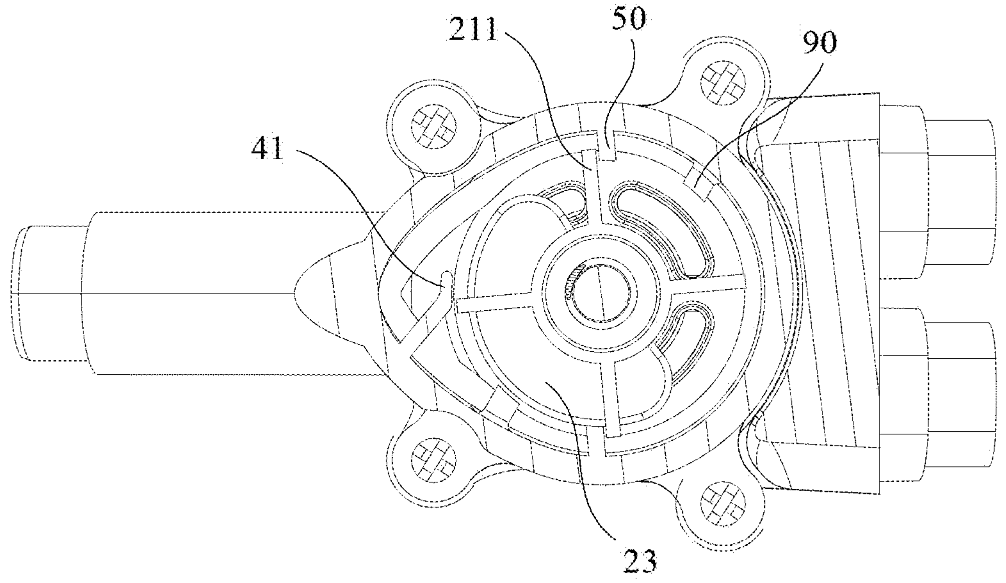
Figure 14A:
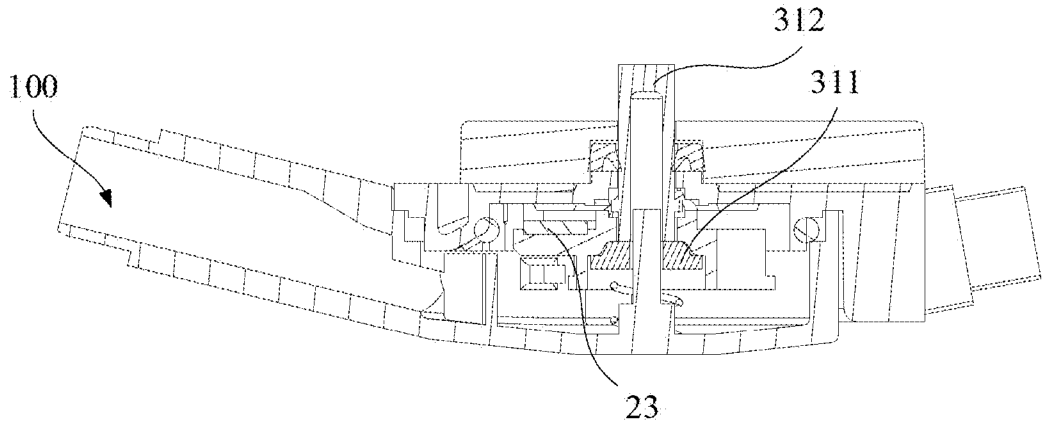
FIGS. 14A and 14B are sectional views of the switching mechanism shown in FIG. 1, in which the stop member is restricted by a third limiting part.
Figure 14B:
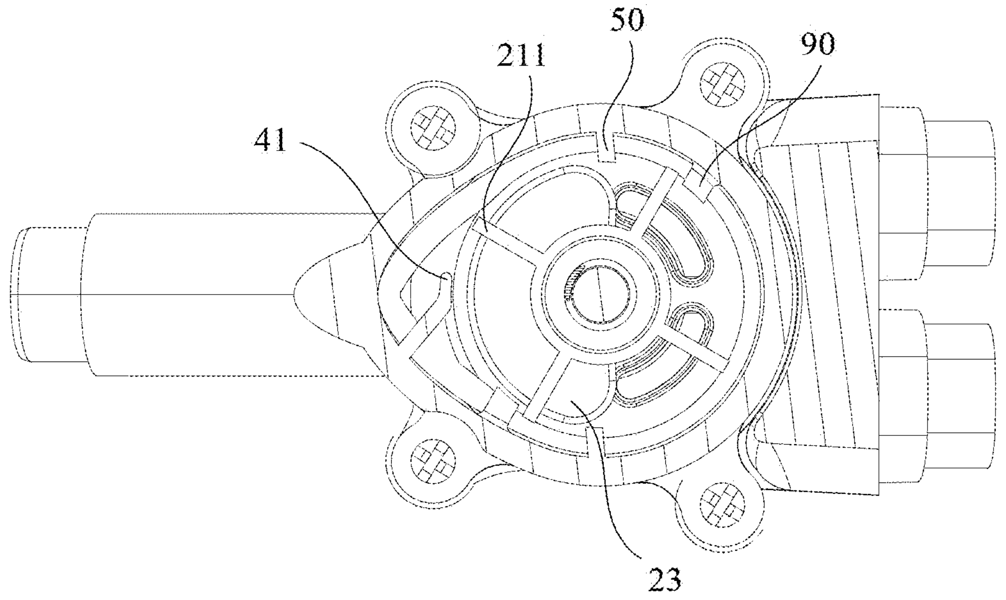
Figure 15A:
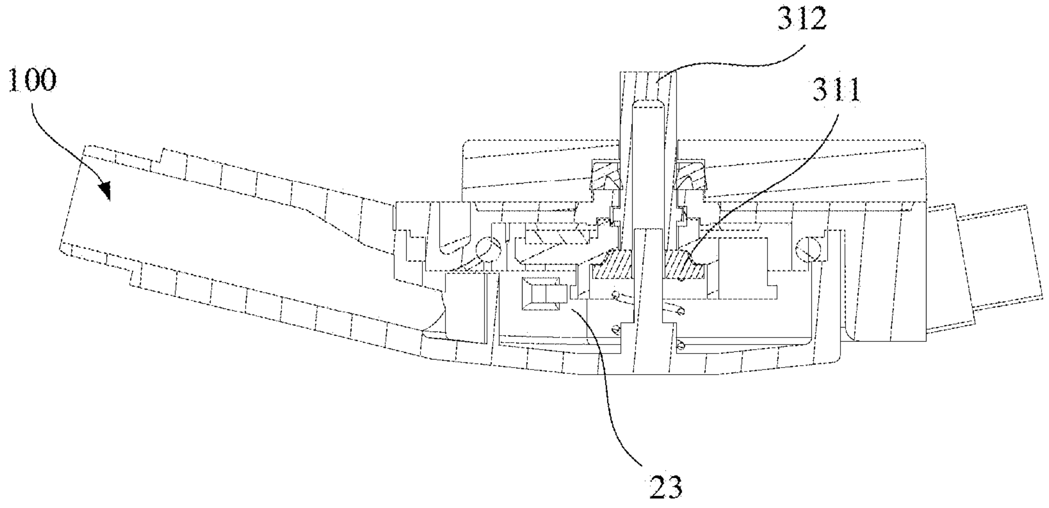
FIGS. 15A and 15B are sectional views of the switching mechanism shown in FIG. 1, in which the switching assembly is reset and position-limitedly connected to another one of multiple switching positions.
Figure 15B:
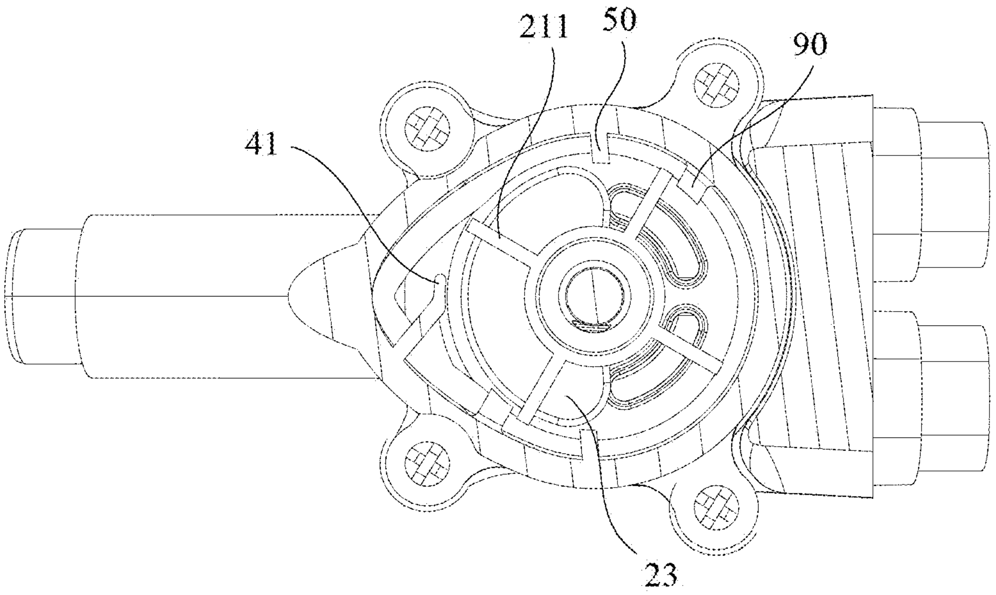

In an embodiment of the present disclosure, the switching mechanism can introduce a liquid into the mounting cavity 200 through the liquid inlet flow channel 100, and at this time, the switching assembly 20 is position-limitedly connected to one of the multiple switching positions. For example, as shown in FIGS. 9B, 10A, and 10B, the switching assembly 20 is position-limitedly connected to the second switching position, and only the first liquid outlet flow channel 301 discharges liquid. Under an action of an external force, the driving part 312 can drive the abutment part 311 to compress the reset spring 32, separate the abutment part 311 from the switching assembly 20, and drive the switching assembly 20 to move out of the second switching position after moving a certain distance, so that the stop member 21 is gradually disengaged from the restriction of the third limiting part 90, as shown in FIGS. 11A and 11B. The stop member 21 is completely out of the restriction of the third limiting part 90 and at least partially located in the second position 202, the switching assembly 20 can rotate around the first direction under the driving of a liquid until the stop member 21 is position-limitedly connected with the first limiting part 50, as shown in FIGS. 12A and 12B. After the external force is withdrawn, the reset spring 32 can drive the switching assembly 20 by the abutment part 311 to move toward the first position 201, and the stop member 21 is gradually disengaged from the restriction of the first limiting part 50, as shown in FIGS. 13A and 13B. The stop member 21 is completely disengaged from the restriction of the first limiting part 50, and can rotate around the first direction under the driving of a liquid until the stop member 21 is position-limitedly connected with the third limiting part 90, as shown in FIGS. 14A and 14B. The switching assembly 20 moves under the limit of the stop member 21 and the third limiting part 90, until the switching assembly 20 is position-limitedly connected to the third switching position, and the first liquid outlet flow channel 301 and the second liquid outlet flow channel 302 discharge liquid simultaneously, as shown in FIGS. 9C, 15A, and 15B.

In the description of the present disclosure, it should be noted that the orientation or position relationships indicated by the terms “upper”, “lower”, “one side”, “the other side”, “one end”, “the other end”, “side”, “relative”, “corners”, “periphery” and “square structure” or the like are based on the orientation or position relationships shown in the drawings, which are only for convenience of describing the present disclosure and simplifying the description, rather than indicating or implying that the structure referred has the specific orientation, or is constructed and operated in the specific orientation, and thus cannot be interpreted as a limitation on the present disclosure.

In the description of embodiments of the present disclosure, unless otherwise explicitly specified and limited, the terms "connection", "direct connection", "indirect connection", "fixed connection", "installation" and "assembly" should be broadly understood, for example, it may be a fixed connection, a detachable connection or an integrated connection. The terms "installation", "connection" and "fixed connection" may be direct connection, or indirect connection through an intermediate medium, or an internal communication between two elements. For those of ordinary skills in the art, the specific meanings of the aforementioned terms in the present disclosure may be understood according to specific situation.

Although the implementations of the present disclosure are disclosed above, the described contents are only the implementations adopted for facilitating understanding of the present disclosure, which are not intended to limit the present disclosure. It should be noted that the above embodiments or implementations are exemplary only and not limiting. Therefore, the present disclosure is not limited to what is specifically shown and described herein. Various modifications, substitutions or omissions may be made to the form and details of implementation without departing from the scope of the present disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A switching mechanism, comprising:

a housing assembly, the housing assembly having a liquid inlet flow channel, a mounting cavity, and at least one liquid outlet flow channel, wherein the mounting cavity is communicated between the liquid inlet flow channel and the liquid outlet flow channel, the mounting cavity has a first position and a second position sequentially provided in a first direction, and the first position has a plurality of switching positions;

a switching assembly, the switching assembly movably mounted in the mounting cavity, wherein the switching assembly is at least partially located at the first position and configured to be capable of being position-limitedly connected to different switching positions to change an communication/discommunication state between the mounting cavity and the at least one liquid outlet flow channel;

a reset spring, the reset spring provided in the housing assembly and being capable of generating a driving force for abutting the switching assembly against the first position; and a driving member, the driving member movably mounted in the housing assembly, wherein the driving member is configured to be movable relative to the switching assembly in the first direction under an action of an external force, to compress the reset spring, and the switching assembly is driven to move out of one of the plurality of switching positions after the driving member moves a distance and to be at least partially located at the second position, so that the switching assembly is capable of being driven by a liquid entering the mounting cavity from the liquid inlet flow channel to rotate around the first direction until the switching assembly is position-limitedly connected to the housing assembly, and after the external force is withdrawn, the switching assembly is capable of being moved out of the second position and position-limitedly connected to another one of the plurality of switching positions under an action of the driving force and a limitation of the housing assembly, and the driving member is capable of being reset under an action of the reset spring;

wherein the driving member comprises an abutment part and a driving part;

the abutment part is located between the reset spring and the switching assembly, and the driving force is capable of acting on the switching assembly through the abutment part;

the driving part is capable of driving the abutment part to be separated from the switching assembly and compressing the reset spring by the abutment part, and the driving part drives the switching assembly to move out of one of the plurality of switching positions after the driving part moves a distance, and to be at least partially located at the second position.

2. The switching mechanism according to claim 1, wherein the switching assembly is provided with an abutment groove, and the abutment part is movably mounted in the abutment groove;

the switching assembly is further provided with a passage slot, the passage slot and the abutment groove are coaxially provided in the first direction and communicated with each other, and the driving part passes through the passage slot and abuts against a side of the abutment part facing away from the reset spring.

3. The switching mechanism according to claim 2, wherein a groove bottom of the abutment groove is provided with a first positioning groove, and the abutment part is provided with a positioning protrusion positioning-fitted with the first positioning groove.

4. The switching mechanism according to claim 1, wherein a driving protrusion is provided on a circumferential outer side of the driving part, and after the driving part is moved by a distance, the driving protrusion is capable of abutting against a side of the switching assembly facing away from the abutment part, so as to drive the switching assembly to move out of one of the plurality of switching positions and to be at least partially located at the second position.

5. The switching mechanism according to claim 4, wherein a second positioning groove is provided on a side of the switching assembly facing away from the abutment part, and the driving protrusion is capable of being positioning-fitted with the second positioning groove.

6. The switching mechanism according to claim 1, wherein the housing assembly is provided with a guide post extending in the first direction, the abutment part and the driving part are provided with a through slot and a guide groove, respectively, and the through slot and the guide groove are guidance-fitted with the guide post.

7. The switching mechanism according to claim 1, wherein the housing assembly is provided with a flow guide member, the flow guide member is provided in the mounting cavity, and the flow guide member is configured to guide a liquid to the switching assembly in a direction, so as to drive the switching assembly to rotate around the first direction until the switching assembly is position-limitedly connected to the housing assembly;

the flow guide member comprises a deflection part and a flow limiting part, the deflection part faces a direction in which a liquid flows into the mounting cavity and is deflected toward the direction, and the flow limiting part is provided between the deflection part and the housing assembly.

8. The switching mechanism according to claim 7, wherein the switching assembly has at least one stop member, each stop member is capable of being at least partially located at the second position during a removal of the switching assembly from one of the plurality of switching positions;

the housing assembly is provided with at least one first limiting part, the first limiting part is provided in the second position, wherein a quantity of at least one of the stop members and the first limiting parts is the same as a quantity of the switching positions;

the flow guide member is configured to guide a liquid in a direction to the at least one stop member to drive the switching assembly to rotate around the first direction until the at least one stop member is position-limitedly connected with the first limiting part.

9. The switching mechanism according to claim 8, wherein the switching assembly has at least one limit member, the housing assembly is provided with at least one second limiting part, and the second limiting part is provided in the first position;

a quantity of the limit members is the same as a quantity of the switching positions, each second limiting part is capable of being position-limitedly connected to a different limit member, so that the switching assembly is position-limitedly connected to a different switching position;

the driving member is configured to be capable of moving relative to the switching assembly in the first direction under an action of an external force, to compress the reset spring, and the switching assembly is driven after the driving member moves a distance, so that the second limiting part is capable of being separated from one of a plurality of limit members, and the switching assembly is capable of being moved out of one of the plurality of switching positions, and each stop member is capable of being least partially located at the second position, so that the switching assembly is capable of being driven by a liquid to rotate around the first direction until the at least one stop member is position-limitedly connected with the first limiting part, and after the external force is withdrawn, the switching assembly is capable of being moved out of the second position under an action of the driving force and the limiting of the stop member and the first limiting part that are position-limitedly connected, so that the second limiting part is capable of being position-limitedly connected to another one of the plurality of limit members, and the switching assembly is capable of being position-limitedly connected to another one of the plurality of switching positions; or the switching assembly has at least one limit member, the housing assembly is provided with at least one second limiting part, and the second limiting part is provided in the first position;

a quantity of the second limiting parts is the same as a quantity of the switching positions, each limit member is capable of being position-limitedly connected to a different second limiting part, so that the switching assembly is position-limitedly connected to a different switching position;

the driving member is configured to be capable of moving relative to the switching assembly in the first direction under an action of an external force, to compress the reset spring, and the switching assembly is driven after the driving member moves a distance, so that the limit member is capable of being separated from one of a plurality of second limiting parts, and the switching assembly is capable of being moved out of one of the plurality of switching positions, and each stop member is capable of being least partially located at the second position, so that the switching assembly is capable of being driven by a liquid to rotate around the first direction until the at least one stop member is position-limitedly connected with the first limiting part, and after the external force is withdrawn, the switching assembly is capable of being moved out of the second position under an action of the driving force and the limiting of the stop member and the first limiting part that are position-limitedly connected, so that the limit member is capable of being position-limitedly connected to another one of the plurality of second limiting parts, and the switching assembly is capable of being position-limitedly connected to another one of the plurality of switching positions.

10. The switching mechanism according to claim 9, wherein one of the limit member and the second limiting part has a convex structure, and the other of the limit member and the second limiting part has a groove structure, and the convex structure is capable of being accommodated in the groove structure, so that the limit member and the second limiting part are position-limitedly connected.

11. The switching mechanism according to claim 10, wherein the convex structure has a first guide surface and a second guide surface, the first guide surface and the second guide surface are provided coaxially with the first direction, the first guide surface spirally rises clockwise around the first direction, and the second guide surface spirally descends clockwise around the first direction;

the groove structure has a first groove bottom and a second groove bottom, the first groove bottom and the second groove bottom are provided coaxially with the first direction, the first groove bottom spirally rises clockwise around the first direction and is capable of being slidably fitted with the first guide surface, and the second groove bottom spirally descends clockwise around the first direction and is capable of being slidably fitted with the second guide surface;

after the external force is withdrawn, the switching assembly is capable of being moved out of the second position under the action of the driving force and the limiting of the stop member and the first limiting part that are position-limitedly connected, the first guide surface is capable of being fitted against the first groove bottom and sliding relative to the first groove bottom, or the second guide surface is capable of being fitted against the second groove bottom and sliding relative to the second groove bottom, so that the convex structure is capable of being accommodated in the groove structure.

12. The switching mechanism according to claim 11, wherein the housing assembly is provided with at least one third limiting part, and the third limiting part is provided in the mounting cavity;

the third limiting part and the first limiting part are provided at intervals around the first direction, the third limiting part has a first end and a second end, the first end is provided in the first direction facing the first position, the second end is provided facing away from the first position, the first limiting part has a third end provided facing the first position, a plane where the third end is located is located between the first end and the second end in the first direction;

the stop member is configured to be position-limitedly fitted with the third limiting part after the switching assembly is position-limitedly connected to different switching positions;

during the process of the driving member moving a distance, the convex structure is capable of being separated from the groove structure, and the stop member is capable of being separated from the third limiting part and at least partially located at the second position to be capable of rotating around the first direction under the driving of a liquid until the stop member is position-limitedly fitted with the first limiting part;

after the external force is withdrawn, the switching assembly is capable of being moved out of the second position under an action of the driving force and a limiting of the stop member and the first limiting part that are position-limitedly connected, the stop member is capable of being separated from the first limiting part and is capable of rotating around the first direction under the driving of a liquid until the stop member is position-limitedly fitted with the third limiting part, the convex structure is capable of being accommodated in the groove structure, so that the switching assembly is position-limitedly connected to another one of the plurality of switching positions.

13. The switching mechanism according to claim 9, wherein the housing assembly is provided with a liquid dispensing surface facing the second position, and each liquid outlet flow channel is capable of penetrating the liquid dispensing surface to form a liquid dispensing hole communicated with the mounting cavity on the liquid dispensing surface;

the switching assembly comprises an elastic part, the switching assembly is position-limitedly connected to one of the plurality of switching positions, and the elastic part is capable of elastically abutting against the liquid dispensing surface to block at least one of a plurality of liquid dispensing holes.

14. The switching mechanism according to claim 13, wherein the switching assembly further comprises a main body, and the stop member, the limit member, and the elastic part are all provided on the main body.

15. A liquid outlet device, comprising:

the switching mechanism as claimed in claim 1.

* * * * *